United States Patent
Berntorp et al.

(10) Patent No.: US 10,408,638 B2
(45) Date of Patent: Sep. 10, 2019

(54) SYSTEM AND METHOD FOR CONTROLLING A VEHICLE UNDER SENSOR UNCERTAINTY

(71) Applicant: Mitsubishi Electric Research Laboratories, Inc., Cambridge, MA (US)

(72) Inventors: Karl Berntorp, Watertown, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 85 days.

(21) Appl. No.: 15/862,568

(22) Filed: Jan. 4, 2018

(65) Prior Publication Data

US 2019/0204114 A1    Jul. 4, 2019

(51) Int. Cl.
*G01C 25/00* (2006.01)
*B60R 16/023* (2006.01)
(Continued)

(52) U.S. Cl.
CPC .......... *G01C 25/00* (2013.01); *B60R 16/0231* (2013.01); *B60W 40/105* (2013.01);
(Continued)

(58) Field of Classification Search
CPC .... G01C 25/00; B60R 16/023; B60W 40/105; B60W 40/109; B60W 40/114; B62D 15/021
(Continued)

(56) References Cited

U.S. PATENT DOCUMENTS 6,778,928 B2    8/2004  Stiller
8,065,067 B2 *  11/2011  Svendenius ............. B60T 8/172
                                                      701/80
(Continued)

OTHER PUBLICATIONS

Lundquista et al., "Joint Ego-Motion and Road Geometry Estimation." Division of Automatic Control, Department of Electrical Engineering, Linkoping University, SE-581 83 Linkoping, Sweden. Apr. 1, 2010.

*Primary Examiner* — Yazan A Soofi
(74) *Attorney, Agent, or Firm* — Gennadiy Vinokur; James McAleenan; Hironori Tsukamoto

(57) ABSTRACT

A system for controlling a vehicle a sensor to sense measurements indicative of a state of the vehicle and a memory to store a motion model of the vehicle, a measurement model of the vehicle, and a mean and a variance of a probabilistic distribution of a state of calibration of the sensor. The motion model of the vehicle defines the motion of the vehicle from a previous state to a current state subject to disturbance caused by an uncertainty of the state of calibration of the sensor in the motion of the vehicle. The measurement model relates the measurements of the sensor to the state of the vehicle using the state of calibration of the sensor. The system includes a processor to update the probabilistic distribution of the state of calibration based on a function of the sampled states of calibration weighted with weights determined based on a difference between the state of calibration sampled on a feasible space defined by the probabilistic distribution and the corresponding state of calibration estimated based on the measurements using the motion and the measurements models. The system includes a controller to control the vehicle using the measurements of the sensor adapted using the updated probabilistic distribution of the state of calibration of the sensor.

20 Claims, 25 Drawing Sheets

(51) Int. Cl.
*B60W 40/105* (2012.01)
*B60W 40/109* (2012.01)
*B60W 40/114* (2012.01)
*B62D 15/02* (2006.01)
*G01D 18/00* (2006.01)
*G01P 21/00* (2006.01)
*G01C 21/20* (2006.01)
*G01C 23/00* (2006.01)
*G06F 17/50* (2006.01)
*G06F 17/18* (2006.01)

(52) U.S. Cl.
CPC ........ *B60W 40/109* (2013.01); *B60W 40/114* (2013.01); *B62D 15/021* (2013.01); *G01C 21/20* (2013.01); *G01C 23/00* (2013.01); *G01D 18/00* (2013.01); *G01P 21/00* (2013.01); *G06F 17/18* (2013.01); *G06F 17/5009* (2013.01); *B60W 2520/10* (2013.01); *B60W 2520/125* (2013.01); *B60W 2520/14* (2013.01); *B60W 2540/18* (2013.01); *G06F 2217/16* (2013.01)

(58) Field of Classification Search
USPC .......................................................... 701/30
See application file for complete search history.

(56) References Cited

U.S. PATENT DOCUMENTS

| | | | |
|---|---|---|---|
| 8,731,769 B2* | 5/2014 | Hsu | G01C 21/16 701/33.1 |
| 2012/0022780 A1 | 1/2012 | Kulik et al. | |
| 2013/0332112 A1* | 12/2013 | Nakamura | G01S 17/936 702/181 |
| 2014/0288779 A1* | 9/2014 | Di Cairano | B62D 15/0235 701/42 |
| 2015/0224845 A1* | 8/2015 | Anderson | B60G 17/019 701/37 |
| 2017/0124781 A1* | 5/2017 | Douillard | G01S 15/931 |
| 2018/0015931 A1* | 1/2018 | Berntorp | B60W 40/12 |
| 2018/0273046 A1* | 9/2018 | Berntorp | B60W 40/10 |

* cited by examiner

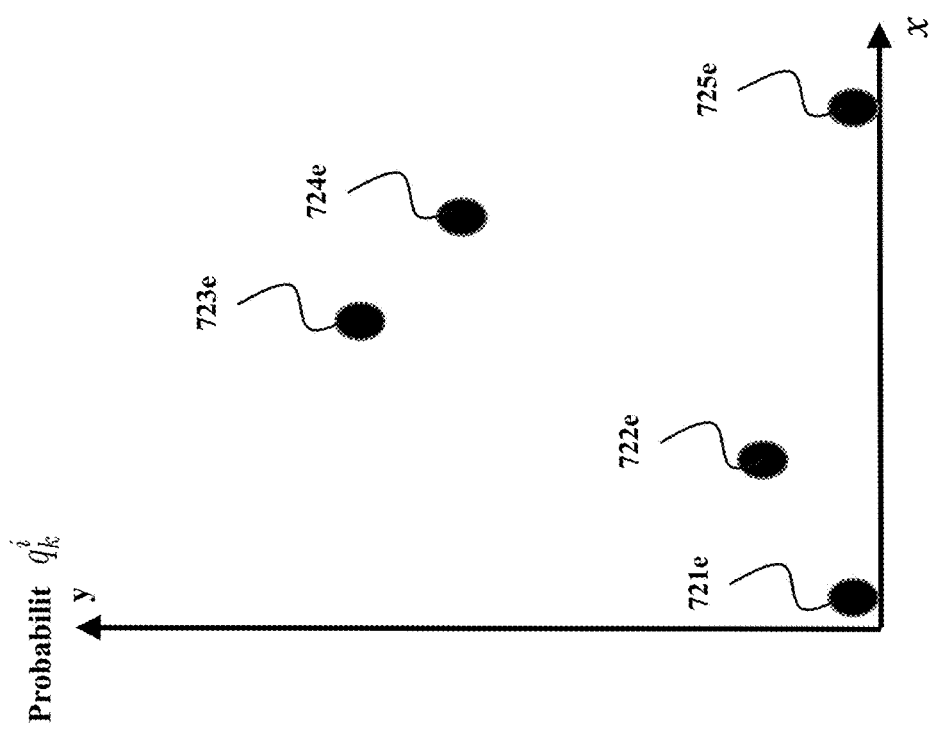

SYSTEM AND METHOD FOR CONTROLLING A VEHICLE UNDER SENSOR UNCERTAINTY

TECHNICAL FIELD

This invention relates to control of a vehicle, and more specifically to calibrating sensors of a vehicle and/or using the measurements of the calibrated sensor to control the movement of the vehicle.

BACKGROUND

Sensor calibration is a key component for advanced driver-assistance systems. A number of the sensors found in the current generation of production vehicles are typically of low cost and as a consequence prone to time-varying offset and scale errors, and subject to large noise. For instance, the lateral acceleration and heading (yaw)-rate measurements can have drift and large noise in the sensor measurements, forcing the measurements to be reliable for prediction over a very limited time interval. Similarly, the sensor measuring the steering-wheel angle has an offset error that, when used for dead reckoning in a vehicle model, leads to prediction errors that accumulate over time. To complicate things even further, the wheel-speed sensors lead to errors in the vehicle-speed estimate due to a scale error in the tire radius estimate.

The recent surge for enabling new advanced driver-assistance systems (ADAS) and autonomous capabilities implies a need for sensor information that can be used over longer time intervals to reliably predict the vehicle motion. The underlying theme of how to achieve more reliable sensor information is to leverage sensor fusion, to utilize existing low-cost sensors as efficiently as possible for as many purposes and driver-assistance features as possible.

To that end, there is a need to determine offset and noise of the sensors of the vehicle. In addition, while some sensor calibration can be performed beforehand, when mounted in a vehicle, some sensors, such as an accelerometer, can have an effective noise level that differs from the a priori determined. The reason is that the sensor noise is dependent on a number of factors such as temperature, age, and where in the vehicle the sensor is placed. For instance, the higher the sensor is placed, the more of the disturbances from the suspension system affect the apparent noise in the sensor.

Accordingly, there is a need for a method and a system for real-time calibration of the offsets and the noise in the sensors of the vehicle. Unfortunately, known solutions are based on simplistic averaging techniques to compensate for the yaw rate and steering wheel bias. However, averaging methods are based on simplistic assumptions about the vehicle behavior, such as straight driving, and cannot estimate the offsets during general driving. See, e.g., a method described in U.S. Pat. No. 8,731,769.

SUMMARY

It is an object of some of the embodiments to provide a system and a method for determining the sensor offsets of the vehicle sensors, such as inertial sensors and steering wheel sensors, and the tire radius of the wheels. Another object of some embodiments is to determine the sensor offsets during real-time operation of the vehicle. As used herein, a sensor can be any type of object that provides information indicative of the motion of the vehicle.

It is another object of various embodiments to determine the statistical properties of the vehicle sensors, such as the variation of the sensor measurements. While the statistical properties such as variances are oftentimes determined a priori, the variance of a sensor changes with time and temperature, and depends on the placement of the sensor. Hence, several embodiments are focused on determining the statistical properties in real-time operation of a vehicle.

Some embodiments are based on recognition that the motion of the vehicle is dependent on the accuracy of measurements of the sensors. To that end, it is tempting to calibrate the sensor by simultaneously and iteratively estimating the state of the vehicle and the state of calibration of the sensors. However, in order to estimate the state of the vehicle and the state of calibration of the sensors iteratively over consecutive time instants, two motion models are needed, one of the motion of the state of the vehicle and one of the motion of the state of calibration of sensors. The motion of the state of the vehicle is determined by the motion model of the vehicle. However, the time evolution of the state of calibration of sensors is unknown, and any model of the motion of the state of calibration of sensors is therefore unknown and cannot be verified.

Some embodiments are based on another recognition that the unknown state of calibration of sensors can be regarded as stochastic disturbances acting on the, otherwise deterministic, model of the motion of the vehicle. The nature of the stochastic disturbance causes the vehicle to have different possible motions, and therefore different possible states. To that end, some embodiments are based on realization that the motion model of the vehicle includes a combination of a deterministic component of the motion and a probabilistic component of the motion. The deterministic component of the motion is independent from the state of calibration of sensors and defines the motion of the vehicle as a function of time. On the other hand, the probabilistic component of the motion includes the state of calibration of sensors having an uncertainty that acts as the disturbance on the motion of the vehicle. In such a manner, the motion of the vehicle can be modeled including the state of calibration of sensors without knowing a model of the motion (time evolution) of the state of calibration of sensors.

In addition, some embodiments are based on the realization that by finding the offsets and statistical properties using a nonstatistical optimization method, connections to the probabilistic nature of the sensors is lost. Hence, an optimization method that minimizes a cost function to determine the statistical properties and offsets of the sensors from the true measurements, does not take into account that the sensor measurements providing information about the motion of the vehicle is in its nature probabilistic. Therefore, to efficiently estimate the offsets and statistical properties of the sensors, a probabilistic, thus statistical, approach is advantageous, because then the statistical nature of the sensor measurements is captured into the method.

To this end, some embodiments are based on the realization that the offsets in the sensors can be included as the statistical mean value of a stochastic distribution, and that the sensor noise can be included as the variation of the sensor measurements around the mean value of the stochastic distribution. Yet other embodiments are based on the realization that the modeling of the sensors as stochastic distributions can be used in a motion model of the vehicle and a measurement model of the state of the vehicle. As used herein, a state of the vehicle can include one or combination of a longitudinal velocity, a lateral velocity, a rotation rate of the vehicle around the vertical axis of the road, a rotation rate of the vehicle around the longitudinal axis of the road, and a position vector of the vehicle.

For instance, turning the steering wheel of a vehicle results in initiating a turn of the vehicle. Hence, the steering wheel angle of a vehicle affects the motion of the vehicle and can therefore be modeled as the input to a motion model of the vehicle. As another example, information about the vehicle lateral velocity can be implicitly inferred from the lateral acceleration of the vehicle, which can be measured. Hence, the lateral acceleration of the vehicle is indicative and can be part of the measurement model of the vehicle. An interpretation of the sensor offset is then that it acts as a constant, or slowly time varying, disturbance of the measurement.

One embodiment represents the motion model as a model driven by a stochastic disturbance, where the disturbance is representative of the inputs of the vehicle. For instance, in one embodiment the steering angle is represented as a hybrid component of a deterministic part and a stochastic part, where the stochastic part is represented by a mean value, the offset of the steering sensor, and a variance, the noise of the steering sensor.

In some embodiments, the offset and the variance of the sensors are estimated recursively with the vehicle state, where the vehicle state of the motion model gives information about the sensor characteristics, and where the sensor characteristics include information about the vehicle state.

Alternative embodiments represent the vehicle state of the vehicle with a set of particles, where each particle can be a measured state or a state determined during a previous iteration of the recursive estimation. Some embodiments determine the particles by generating a sample from the distribution that models the input to the motion model of the vehicle, and propagates the said sampled input through the vehicle model of the vehicle.

Some embodiments are based on the realization that the effective probabilistic distribution when the mean value and variances are unknown, differs from the same distribution when the mean value and variance are known.

Accordingly, in some embodiments the samples are generated from the effective probabilistic distribution, which accounts for that the uncertainty in mean value and variance causes an additional uncertainty in the probabilistic distribution. Doing in such a manner ensures that variations of the mean and variance due to uncertainty of the knowledge of said statistics, is contained by the effective probabilistic distribution.

In alternative embodiments, the generating of the sample of the input to the motion model is generated by considering the measurements from the previous iteration, to account for any information left out from the previous iteration. Such a generation allows to reuse more of the particles generated during the previous iteration.

Yet other embodiments model parts of the sensor characteristics as part of the inputs to the motion model. Doing in such a manner enables sensor calibration of sensors that act as measurements in the motion model and/or inputs to a vehicle model.

Some embodiments store the estimated offsets and variances obtained during previous vehicle driving. In these embodiments, the stored estimated offsets of variances can be reused as an initialization of the method when, e.g., restarting the vehicle. Such a procedure allows to use fewer particles, hence reducing processor load.

Accordingly, one embodiment discloses a system for controlling a vehicle. The system includes at least one sensor to sense measurements indicative of a state of the vehicle; a memory to store a motion model of the vehicle, a measurement model of the vehicle, and a mean and a variance of a probabilistic distribution of a state of calibration of the sensor, wherein the motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor, and wherein the measurement model relates the measurements of the sensor to the state of the vehicle using the state of calibration of the sensor; a processor configured to sample a feasible space of the state of calibration of the sensor defined by the probabilistic distribution to produce a set of sampled states of calibration of the sensor; estimate, for each sampled state of calibration using the motion model, an estimation of the current state of the vehicle to produce a set of estimated states of the vehicle; estimate, for each estimated state of the vehicle, an estimated state of calibration of the sensor by inserting the measurements and the estimated state of the vehicle into the measurement model; and update the mean and the variance of the probabilistic distribution of the state of calibration of the sensor stored in the memory based on a function of the sampled states of calibration weighted with weights determined based on a difference between the sampled state of calibration and the corresponding estimated state of calibration; and a controller to control the vehicle using the measurements of the sensor adapted using the updated probabilistic distribution of the state of calibration of the sensor.

Another embodiment discloses a method for controlling a vehicle, wherein the method uses a processor coupled with stored instructions implementing the method, wherein the instructions, when executed by the processor carry out at least some steps of the method. The method includes sensing, using at least one sensor, measurements indicative of a state of the vehicle; retrieving, from a memory operatively connected to the processor, a motion model of the vehicle, a measurement model of the vehicle, and a mean and a variance of a probabilistic distribution of a state of calibration of the sensor, wherein the motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor, and wherein the measurement model relates the measurements of the sensor to the state of the vehicle using the state of calibration of the sensor; sampling a feasible space of the state of calibration of the sensor defined by the probabilistic distribution to produce a set of sampled states of calibration of the sensor; estimating, for each sampled state of calibration using the motion model, an estimation of the current state of the vehicle to produce a set of estimated states of the vehicle; estimating, for each estimated state of the vehicle, an estimated state of calibration of the sensor by inserting the measurements and the estimated state of the vehicle into the measurement model; and updating the mean and the variance of the probabilistic distribution of the state of calibration of the sensor stored in the memory based on a function of the sampled states of calibration weighted with weights determined based on a difference between the sampled state of calibration and the corresponding estimated state of calibration; and controlling the vehicle using the measurements of the sensor adapted using the updated probabilistic distribution of the state of calibration of the sensor.

Yet another embodiment discloses a non-transitory computer readable memory embodied thereon a program executable by a processor for performing a method for controlling a vehicle. The method includes receiving, from at least one sensor, measurements indicative of a state of the vehicle; retrieving, from a memory operatively connected to the processor, a motion model of the vehicle, a measurement model of the vehicle, and a mean and a variance of a probabilistic distribution of a state of calibration of the sensor, wherein the motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor, and wherein the measurement model relates the measurements of the sensor to the state of the vehicle using the state of calibration of the sensor; sampling a feasible space of the state of calibration of the sensor defined by the probabilistic distribution to produce a set of sampled states of calibration of the sensor; estimating, for each sampled state of calibration using the motion model, an estimation of the current state of the vehicle to produce a set of estimated states of the vehicle; estimating, for each estimated state of the vehicle, an estimated state of calibration of the sensor by inserting the measurements and the estimated state of the vehicle into the measurement model; and updating the mean and the variance of the probabilistic distribution of the state of calibration of the sensor stored in the memory based on a function of the sampled states of calibration weighted with weights determined based on a difference between the sampled state of calibration and the corresponding estimated state of calibration; and controlling the vehicle using the measurements of the sensor adapted using the updated probabilistic distribution of the state of calibration of the sensor.

BRIEF DESCRIPTION OF THE DRAWINGS

FIG. 7E is a schematic of the determining the probabilities of the states and corresponding tire parameters, and corresponding aggregates according to principles employed by some embodiments.

DETAILED DESCRIPTION

Figure 1A:
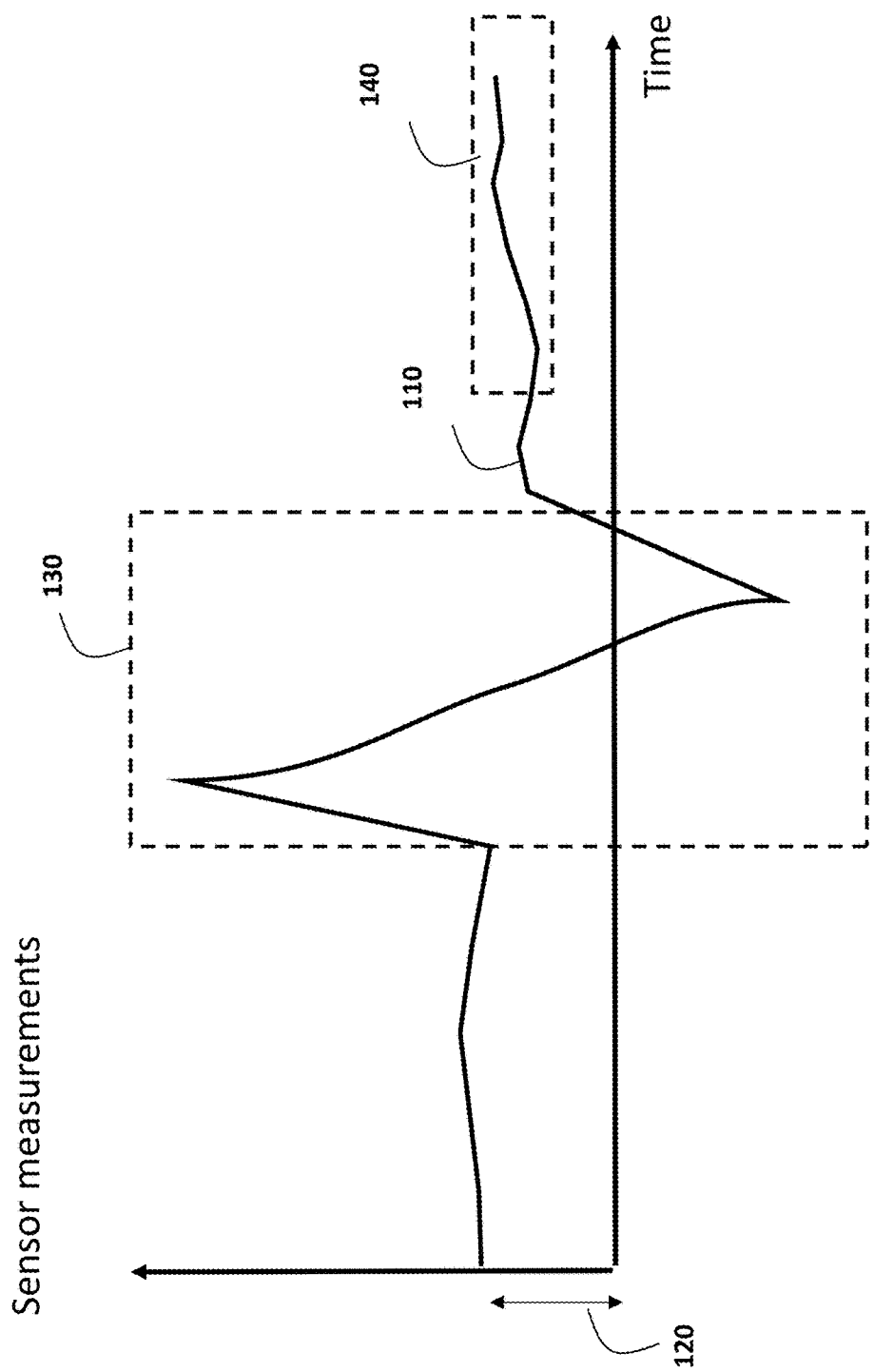
FIG. 1A is an illustration of how the measurements of a sensor of vehicle varies with time in a vehicle controlled by some embodiments.

FIG. 1A shows an illustration of how the measurements 110 of a sensor of vehicle typically varies with time depending on the state of calibration of sensor. As used herein, the state of calibration of sensor includes at least one parameter indicative of the sensor readings of the motion of the vehicle. Examples of the parameter of state of calibration of sensor includes one or a combination of a calibration error, an offset, a temperature dependence, a white noise intensity, a random walk bias, a scale error, a gain error, and a variance. The model of the time variation of the state of calibration of sensor is generally unknown and depends on both intrinsic and extrinsic factors, and the various parameters defining the state of calibration of sensors can depend on each other.

For instance, the state of calibration of sensor of a gyroscope sensor measuring the rotation rate of the vehicle depends on a number of factors, such as the temperature of the environment, the temperature of the sensor components itself, the alignment of the sensor with the vehicle, scale errors, or periodic behavior in the circuits of the sensor. As used herein, a vehicle can be any type of wheeled vehicle, such as a passenger car, bus, or rover. As used herein, a sensor can be any type of sensing device measuring an entity related to the motion of the vehicle. For instance, a sensor can be an accelerometer, a gyroscope, a global positioning system receiver, a sensor measuring the wheel angle, or a wheel encoder. Often, the sensor readings 110 consist of a constant part 120, a slowly time varying part 140, and a part 130 that varies in relation to the motion of the vehicle.

Figure 1B:
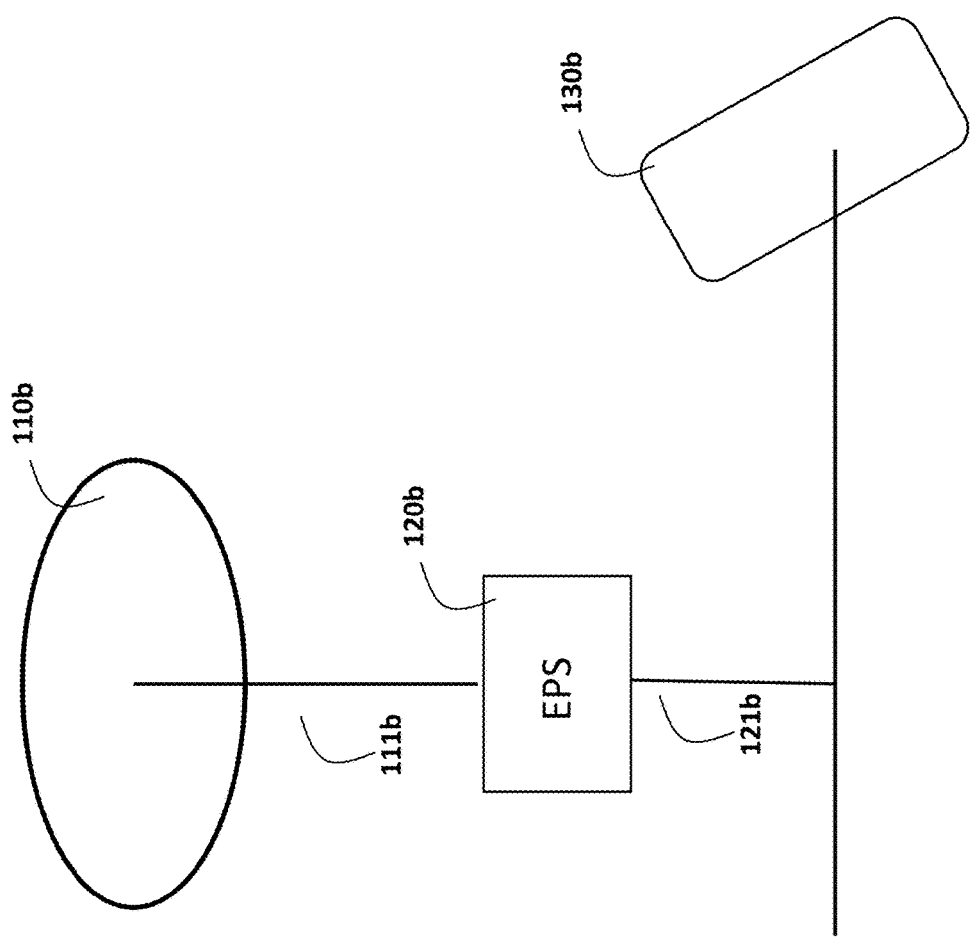
FIG. 1B is an illustration of how the offset of a sensor varies with placement of sensor in a vehicle controlled by some embodiments.

FIG. 1B shows an illustration of how the sensor offset of a sensor of vehicle typically varies with placement of the sensor. FIG. 1B shows a schematic of a construction of interaction between steering wheel 110b and the vehicle wheel 130b. The steering column is equipped with an electric power steering system 120b to help the driver steer the steering wheel. Also on the steering column is a sensor measuring the angle of the wheel. Depending on if the sensor is placed close 111b to the steering wheel or close 121b to the wheel, thereby directly measuring the wheel angle, different offsets will be obtained, as the mechanical construction between steering wheel 110b and vehicle wheel 130b are dynamically dependent and involves gear boxes and other mechanical parts.

Figure 1C:
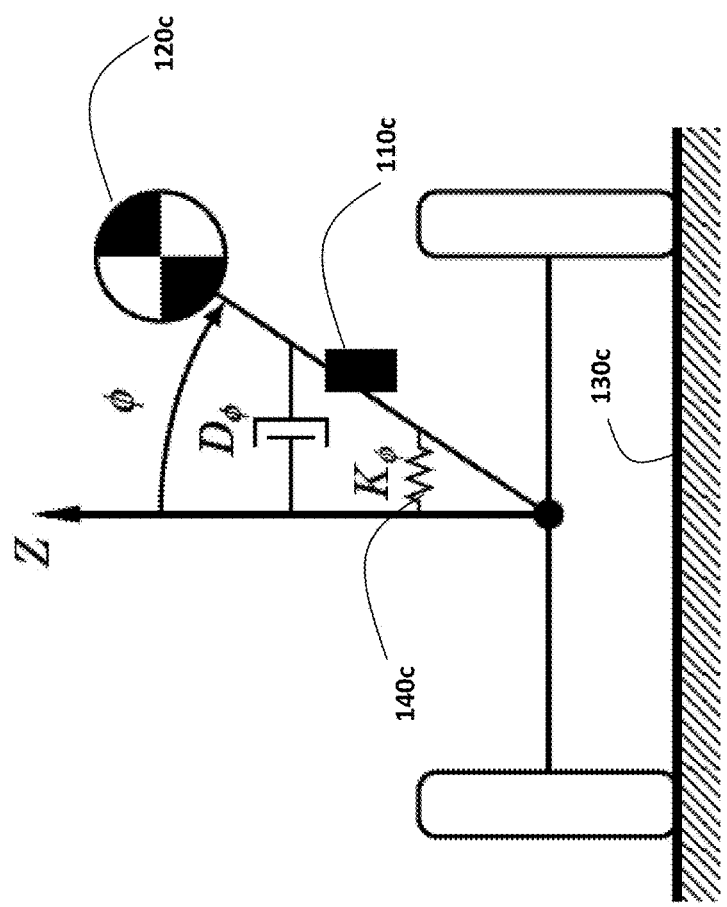
FIG. 1C is an illustration of how the variance of a sensor varies with placement of sensor in a vehicle controlled by some embodiments.

The variance of sensor measurements is also time varying, and to high extent also depends on where the sensor is located in the vehicle. FIG. 1C shows an illustration of how the sensor variance of a sensor of vehicle typically varies with placement of the sensor. For instance, placing an accelerometer 110c higher up relative to the center of mass 120c of the vehicle causes the accelerometer to also sense variations due to external factors, such as unevenness of the road surface 130c or the suspension system 140c in the vehicle. This causes the sensor to have an effective variance that differs from the intrinsic sensor variations, which yields estimation errors when not accounted for.

The time evolution of the state of calibration of sensors is unknown, and any model of the motion of the state of calibration of sensors is therefore unknown and cannot be verified.

To that end, one embodiment recognizes that since the time evolution of the motion of the state of calibration of sensors is unknown, but that the unknown part is typically slowly time varying, the state of calibration of sensors should instead be treated as stochastic disturbances acting on the motion model and/or measurement model. That is, instead of determining the state of calibration of the sensors explicitly, the distribution of the state of calibration of sensors is instead determined, thereby circumventing the need of a motion model of the state of calibration of sensors.

One embodiment of the invention realizes that the although the determining the state of calibration of sensor is complex and depend on effects that are intractable to model, the behavior of the sensor can be summarized in parameters representing an offset of the sensor and a variance of the sensor. For instance, returning to FIG. 1A, the constant part 110 and slowly time varying part 140 can be regarded as the offset of the sensor, whereas the part 130 depends on the motion of the vehicle, with additional disturbance coining from the sensor noise of the sensor.

Knowledge of sensor offsets is useful in vehicle control, for example, electronic stability control, where the lateral acceleration, heading rate, and steering angle of the vehicle wheel are used to control the vehicle. Without knowledge of the offsets, sensing this quantities, the controller of the vehicle will determine control inputs to the vehicle based on an erroneous vehicle model.

Knowledge of the variance of the sensor measurements is also useful in vehicle control. For instance, the variance can be used to determine how much to trust the sensor readings and adjust the control input in relation to the magnitude of the variation of the sensor measurements.

To this end, some embodiments are based on the realization that the offsets in the sensors can be included as the statistical mean value of a stochastic distribution, wherein the stochastic distribution defines the stochastic disturbance with which the state of calibration is described, and that the sensor noise can be included as the variation of the sensor measurements around the mean value of the stochastic distribution. Yet other embodiments are based on the realization that the modeling of the sensors as stochastic distributions can be used in a motion model of the vehicle and a measurement model of the state of the vehicle. As used herein, a state of the vehicle can include one or combination of a longitudinal velocity, a lateral velocity, a rotation rate of the vehicle around the vertical axis of the road, a rotation rate of the vehicle around the longitudinal axis of the road, and a position vector of the vehicle.

To reiterate, some embodiments are based on understanding that the time evolution of the motion of the state of calibration is unknown, but that the unknown part is typically slowly time varying, and, thus, the state of calibration can be treated as stochastic disturbances acting on the motion model and/or measurement model. That is, instead of determining the state of calibration of the sensors explicitly, the distribution of the state of calibration of the sensors can be includes in the motion and the measurement model, thereby circumventing the need of a motion model of the state of calibration itself.

The state of calibration is complex and depends on effects that are intractable to model. However, the behavior of the sensor can be summarized using an offset of the sensor and a variance of the sensor. The offset and variance can be thought as the mean and the variance of the probabilistic distribution of a state of calibration of the sensor. Thus, by updating the probabilistic distribution, the offset and the variance can be determined.

To that end, some embodiments sample the feasible space of the state of calibration with a set of sampled states of calibration and updating iteratively the mean and the variance of the probabilistic distribution of the state of calibration using a difference between the sampled states of calibration and estimated state of calibration estimated using the motion and the measurement models.

Figure 1D:
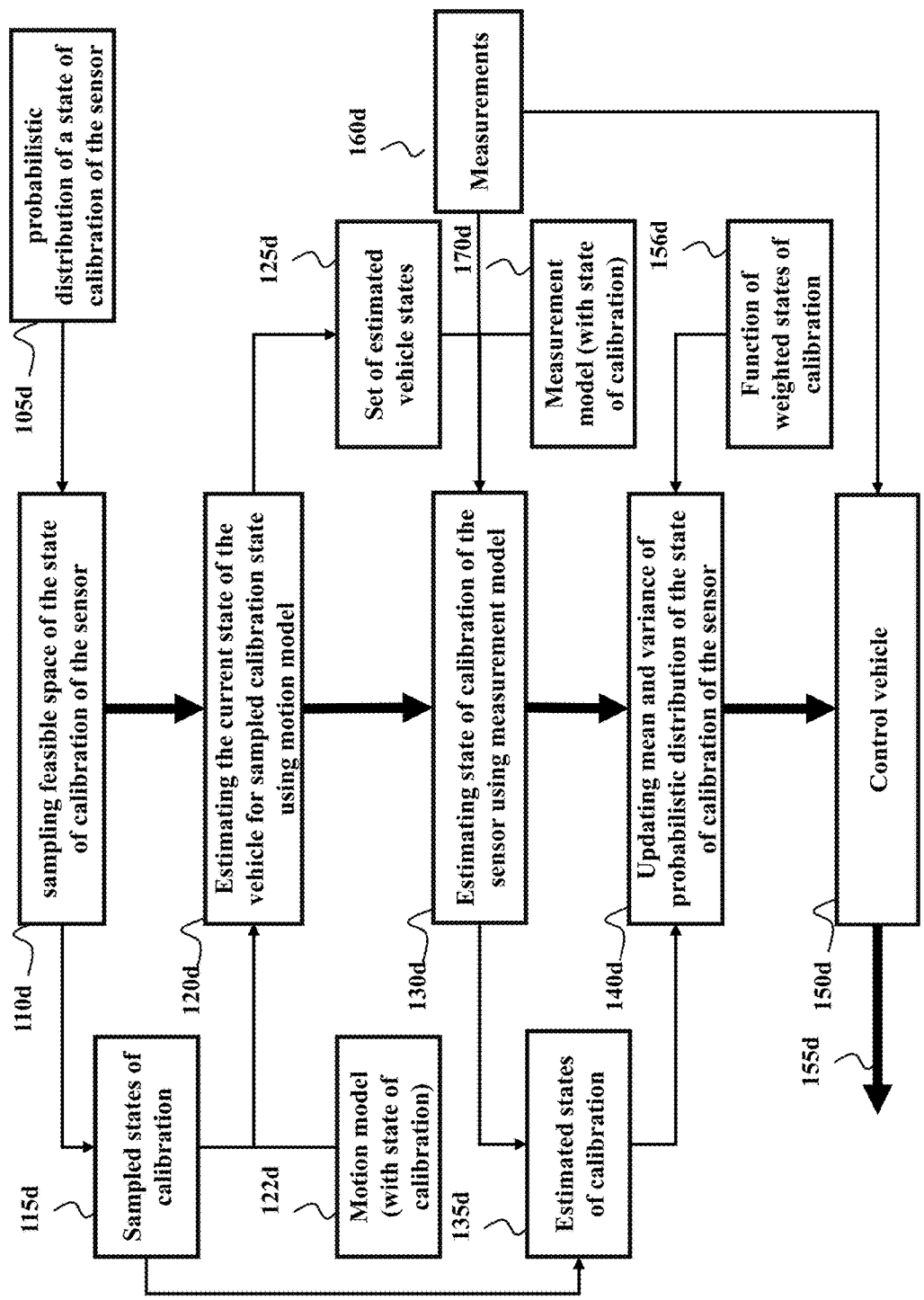
FIG. 1D is a block diagram of a method for controlling a vehicle according to some embodiments.

FIG. 1D shows a block diagram of a method for controlling a vehicle according to some embodiments. The method uses a processor operatively connected to a memory storing a motion model of the vehicle, a measurement model of the vehicle, and a mean and a variance of a probabilistic distribution of a state of calibration of the sensor and to at least one sensor sensing measurements indicative of a state of the vehicle. The motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor. The measurement model relates the measurements of the sensor to the state of the vehicle using the state of calibration of the sensor.

The processor is coupled with stored instructions implementing the method, wherein the instructions, when executed by the processor carry out at least some steps of the method. The method samples 110d a feasible space of the state of calibration of the sensor defined by the probabilistic distribution 105d to produce a set of sampled states of calibration of the sensor 115d, and estimates 120d, for each sampled state of calibration using the motion model 122d, an estimation of the current state of the vehicle to produce a set of estimated states of the vehicle 125d.

Next, the method estimates 130d, for each estimated state of the vehicle, an estimated state of calibration of the sensor 135d by inserting the measurements 160d and the estimated state of the vehicle 125e into the measurement model 170d. The method updates 140d the mean and the variance of the probabilistic distribution 105d of the state of calibration of the sensor stored in the memory based on a function of the sampled states of calibration 115d weighted with weights determined based on a difference between the sampled state of calibration 115d and the corresponding estimated state of calibration 135d. Next, the method controls 150d the vehicle using the measurements of the sensor adapted 155d using the updated probabilistic distribution of the state of calibration of the sensor.

In some embodiments, the set of sampled states of calibration of the sensor represents the state of calibration of the sensor as a set of particles, each particle includes a mean and a variance of the state of calibration of the sensor defining the feasible space of the parameters of the state of calibration of the sensor.

Figure 1E:
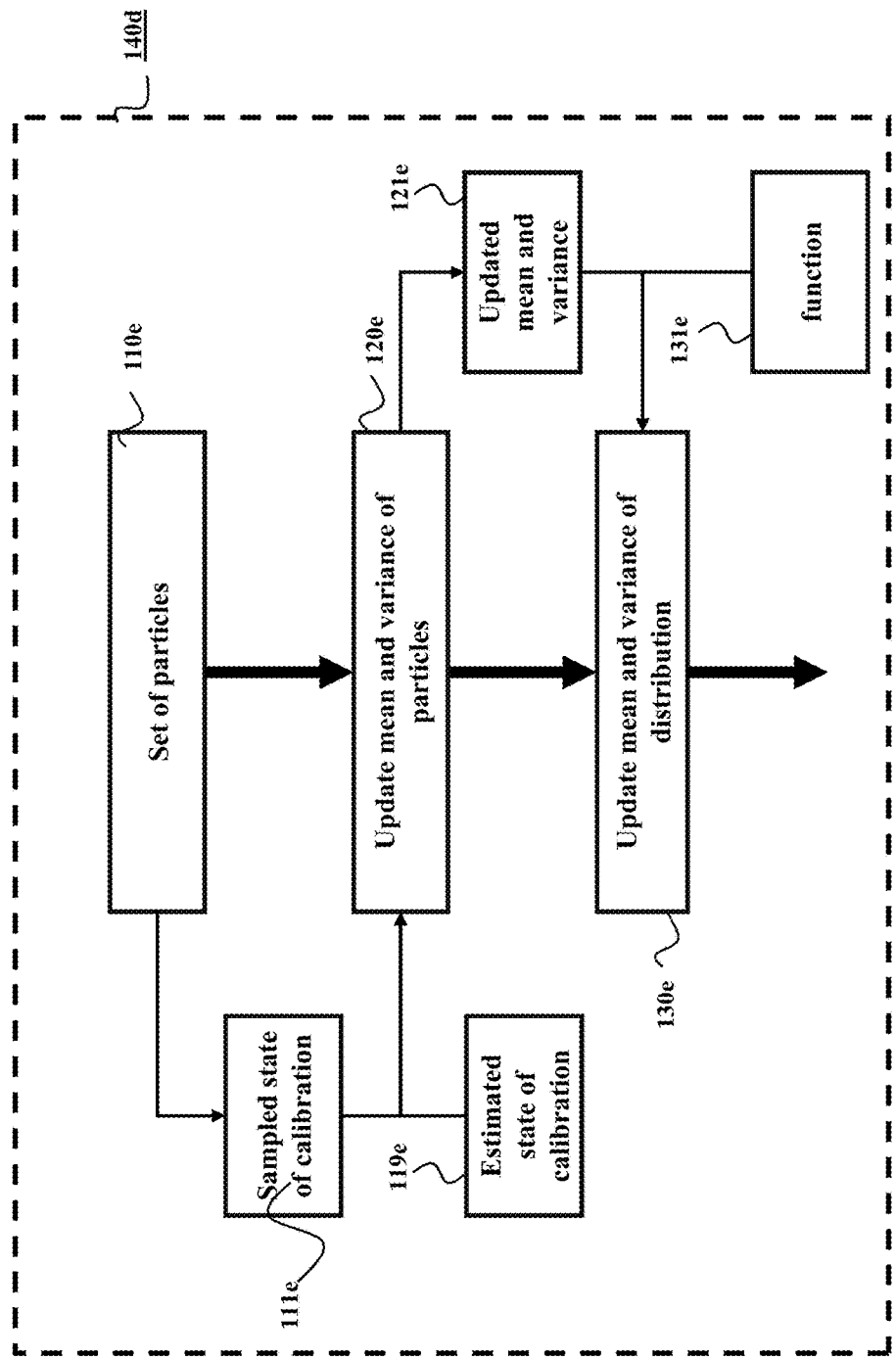
FIG. 1E is a block diagram of a method for updating mean and variance of probabilistic distribution of the state of calibration of the sensor according to some embodiments.

FIG. 1E shows a block diagram of a method for updating mean and variance 140d of probabilistic distribution of the state of calibration of the sensor according to some embodiments. The updating 140d use the particle representation 110e of the state of calibration. Then, the method updates 120e the mean and the variance of at least one particle using a difference between the sampled state of calibration 111e of the sensor sampled for the particle and the estimated state of calibration 119e of the sensor estimated for the particle using the measurement model, to obtain an updated mean and variance 121e of at least one particle. That is, the mean and variance are updated to reflect the difference from measured state of calibration.

Then, the method updates 130e the mean and the variance of the probabilistic distribution of the state of calibration of the sensor as a function 131e of the updated mean and the updated variance of the particle.

In some embodiments, the determining the mean of the estimated state of calibration of the sensor that results in the state of the vehicle estimated for the particle is done according to the measurement model. In other embodiments, the variance of the estimated state of calibration of the sensor is determined as a combination of an uncertainty of the measurements determined from the at least one parameter of the state of calibration of the sensor represented in the particle update the mean of the sampled state of calibration of the sensor of the particle using the mean of the estimated state of calibration of the sensor; and update the variance of the sampled state of calibration of the sensor of the particle using the variance of the estimated state of calibration of the sensor.

The particle representation of the state of calibration is useful because the number of particles, and therefore the amount of information used to represent the probabilistic distribution, can be varying with the available computational demands of other methods in the vehicle. For instance, when the computational load of a safety critical component, such as a vehicle controller, is high, the number of particles can be reduced to save computational resources.

In addition, any probabilistic distribution can be represented by an infinite sum of Gaussian distributions, which in its turn are represented by a mean and variance. That is, even if the Gaussian assumption of the probabilistic distribution of the state of calibration is incorrect per particle, it is correct when aggregating over all the particles.

Figure 1F:
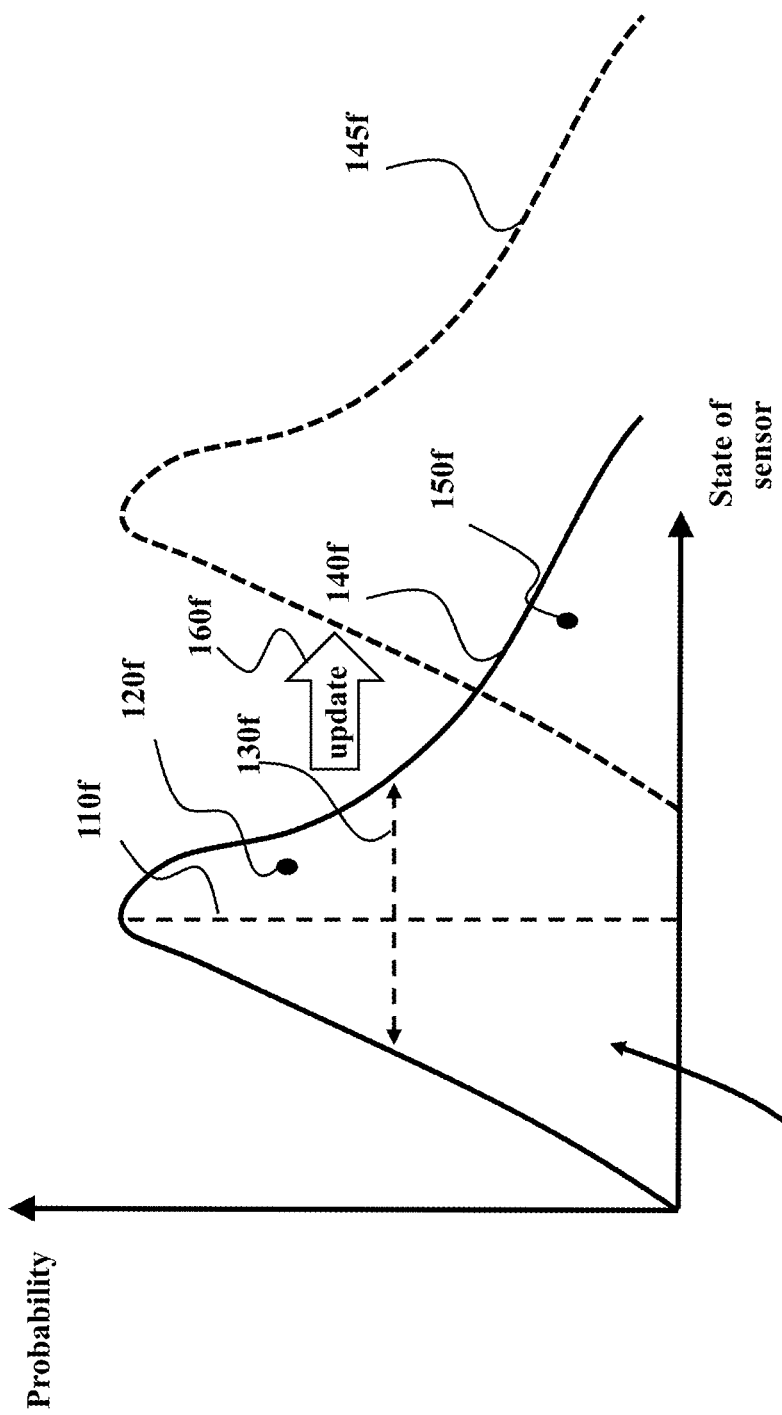
FIG. 1F is a graph illustrating probability distribution function defining the feasible space of the state of calibration for sampling the particles according to some embodiments.

FIG. 1F shows a graph illustrating probability distribution function 140f defining the feasible space 100f of the state of calibration for sampling the particles according to some embodiments. The shape of the probability distribution function 140f can be determined in advance. For example, if the distribution of the state of calibration is Gaussian, the shape of the distribution 140f is the "Gaussian hat" shape. If the shape is fixed, the mean 110f and the variance 130f define the distribution 140f and the feasible space 100f from which the sample of the state of calibration can be drawn.

As used herein, sampling the state of calibration is drawing with probabilities defined by the distribution 140f, which is in turn defined by the mean and the variance of the state of calibration. For example, according to the distribution 140f, the probability of a sample 120f to be drawn or sampled is higher than the probability of the sample 150f. Such a representation allows updating 160f the mean and the variance of the state of calibration to produce an updated distribution 145f defining updated feasible space for sampling state of calibration. This embodiment is based on observation that the update of the mean and the variance of the state of calibration influence the value of the sample of the state of calibration used in the subsequent iteration, because such a sample is drawn from the updated distribution.

Figure 1G:
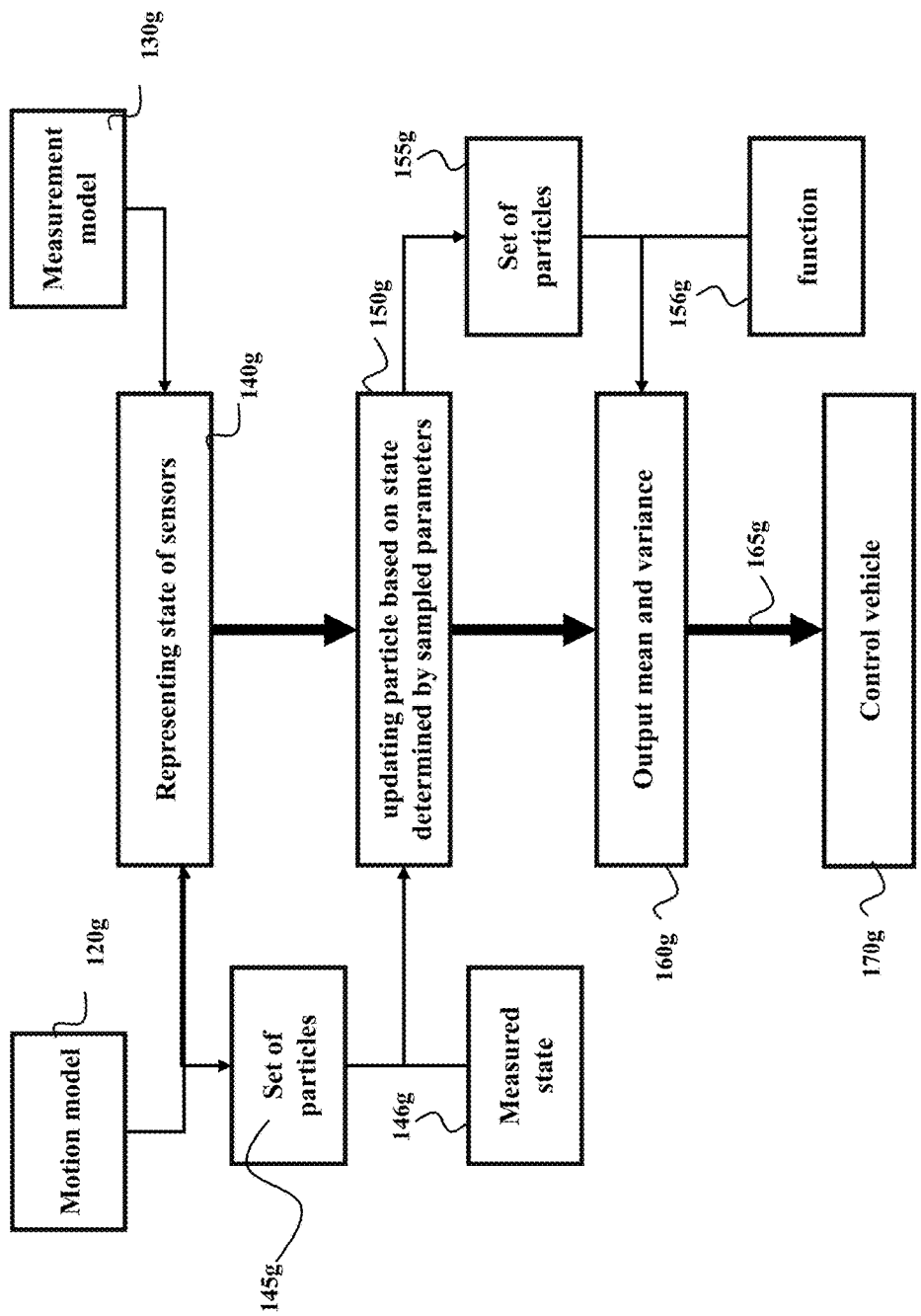
FIG. 1G is a flowchart of a method for controlling a vehicle by jointly estimating a state of a vehicle and state of calibration of sensor of the vehicle according to one embodiment of the invention.

FIG. 1G shows a flowchart of a method for controlling a vehicle by jointly estimating a state of a vehicle, e.g., a velocity and a heading rate of the vehicle, and state of calibration of sensor of the vehicle according to one embodiment of the invention. One embodiment is based on recognition that the unknown state of calibration of at least one sensor, can be regarded as stochastic disturbances acting on a, otherwise deterministic, model of a motion of the vehicle. The nature of the stochastic disturbance causes the vehicle to have different possible motions, and therefore different possible states. For instance, the steering can be used as input to a motion model, and the steering is measured by a sensor of the vehicle.

To that end, the embodiment represents the state of calibration 140g and the state of the vehicle with a set of particles 145g. Each particle includes a state of the vehicle, which can be a measured state or the state determined during a previous iteration of the joint estimation. Additionally, or alternatively, the particle includes a mean, the offset, and variance, the noise of the sensor, of the stochastic disturbance defining a feasible space of the state of calibrations. Representing the state of calibrations probabilistically, i.e., using the mean and the variance allows considering the stochastic disturbance on the motion of the vehicle. To that end, the embodiment samples the feasible space of the state of calibrations used as input to the motion model 120d defined by the parameters, the mean and the variance, of the sensor characteristics and use the sampled state of calibrations in the joint estimation.

In some embodiments the method updates 150g at least one of the particles, including the mean and variance of the state of calibration to produce the updated set 155g. For example, the embodiment updates iteratively the mean and the variance of at least some particles using a difference between a state estimated using parameters sampled on the feasible space of the particle and a mean and a variance of a measured state 146g of sensor determined from measurements of the state of the vehicle according to a measurement model 130g that includes the state of calibration.

Next, the method outputs 160g a mean and a variance of the state of calibration 165g determined as a function 135g of the updated mean and the updated variance in at least one particle. Example of the function 135g include an average, for example, a weighted average of the means and the variances of the particles in the set and a maximal function selecting the mean and the variance of the particle with the largest probability of representing the measured state 146g.

For example, in one implementation, the method determines a probability distribution of the state of the vehicle and the state of the sensor using a probability distribution of the measurement model centered on the measured state. The probability distribution of the measurement model can be determined in advance, for example, using the values of state of calibration determined during previous time instants. Next, the method determines the probability of each particle to represent the true state of the sensor according to a placement of the mean in the particle on the probability distribution of the state of the vehicle and the state of the sensor. Such a probability is used by the function 156g in determining the output 165g.

Figure 1H:
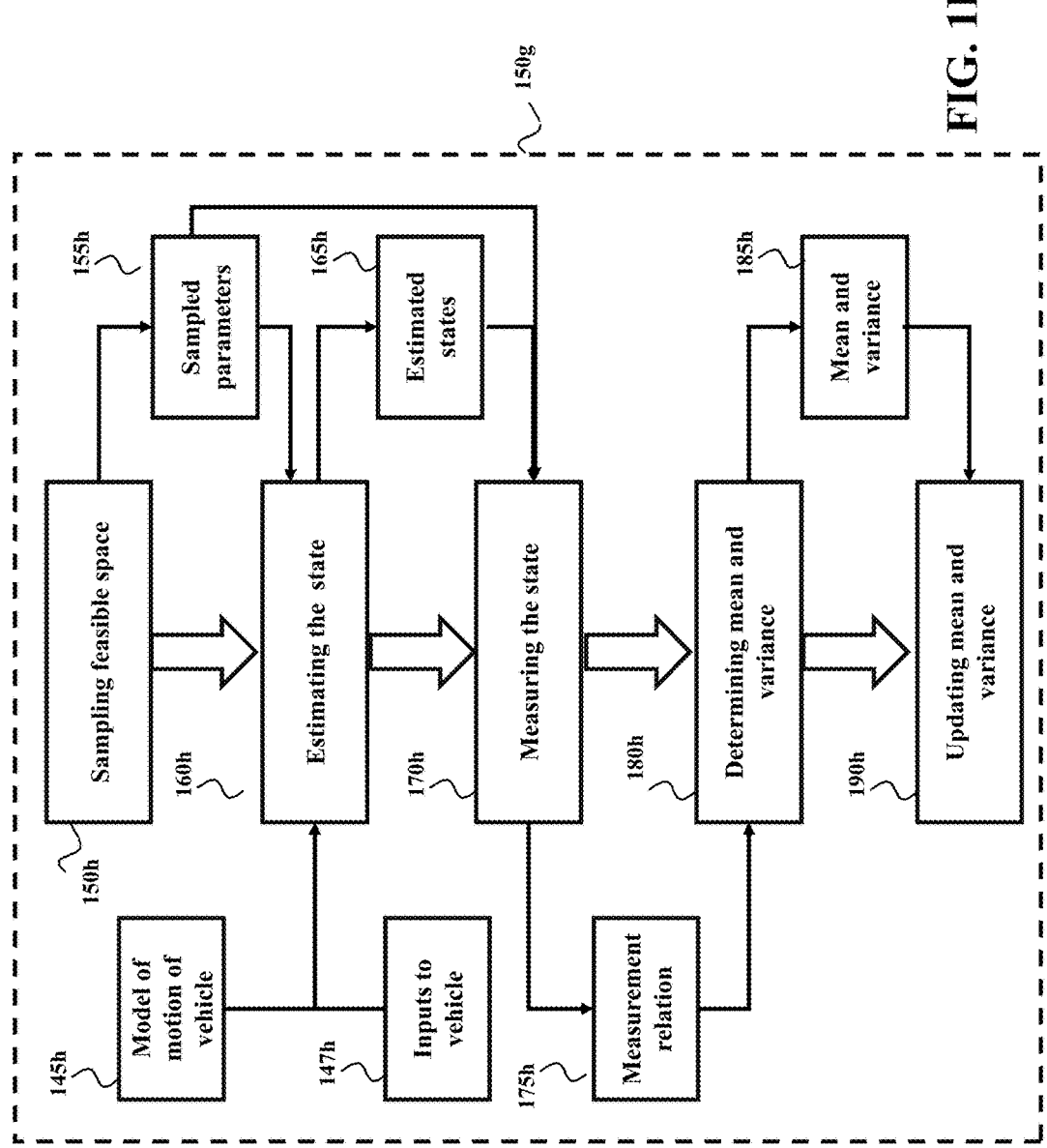
FIG. 1H is a block diagram of one iteration of a method for updating the particle $150g$ according to one embodiment.

FIG. 1H shows a block diagram of one iteration of a method for updating the particle 150g according to one embodiment that updates the particles iteratively, e.g., recursively. The method can be implemented using a processor of the vehicle. The method samples 150h a feasible space of possible parameters to be used in a model of the motion of the vehicle to produce a set of sampled parameters 15h. The model 145h of the motion of the vehicle includes an uncertainty on the motion of the vehicle due to the uncertainty in the state of calibration affecting the motion model. The method estimates 160h, using the model 145h of the motion of the vehicle and inputs 147h to the vehicle, a possible state 165h arising due to each sampled parameter that affects the motion of the vehicle.

Next, the method measures the state 170h. For example, the method measures such a state of the vehicle that depends on the state of calibration of the sensor. The method maps the measurements to a model of the measurement relating the state of the vehicle and the state of calibration of at least one sensor, to produce a relation 175h between the measurement, the state of the vehicle, and the state of calibration. The method determines 180h the offset of the sensor as the statistical mean of the state of calibration for each particle that results in the measured state of the vehicle according to the measurement model 175h. The method also determines 180h the variance of the measured state of calibration resulting from the state of calibration as a difference between the estimated state and the measurement, and/or a difference between the estimated state and the deterministic part of the motion model that would lead to the state were no unknown state of calibration present. The determined 185h mean and variance of the state of calibration are used 190h for updating the offset as a combination of the statistical mean of the state of calibration in the particle using the mean of the measured state of calibration resulting in the measured state of the vehicle and the mean determined during previous iterations. Similarly, the method updates 190h the variance of the state of calibration in the particle using a combination of the variance of the measured state of calibration and the variance determined during previous iterations and.

In one embodiment, a subset of the measurements has known variance and offset, that is, known parameters, which have been determined a priori or by some other method. In that case, the measurement with known variance and offset can be used to improve the estimation of the mean and variance of the sensor characteristics of the sensors with unknown parameters, by using the sensor with known parameters to estimate parts of the state of the vehicle.

Figure 2A:
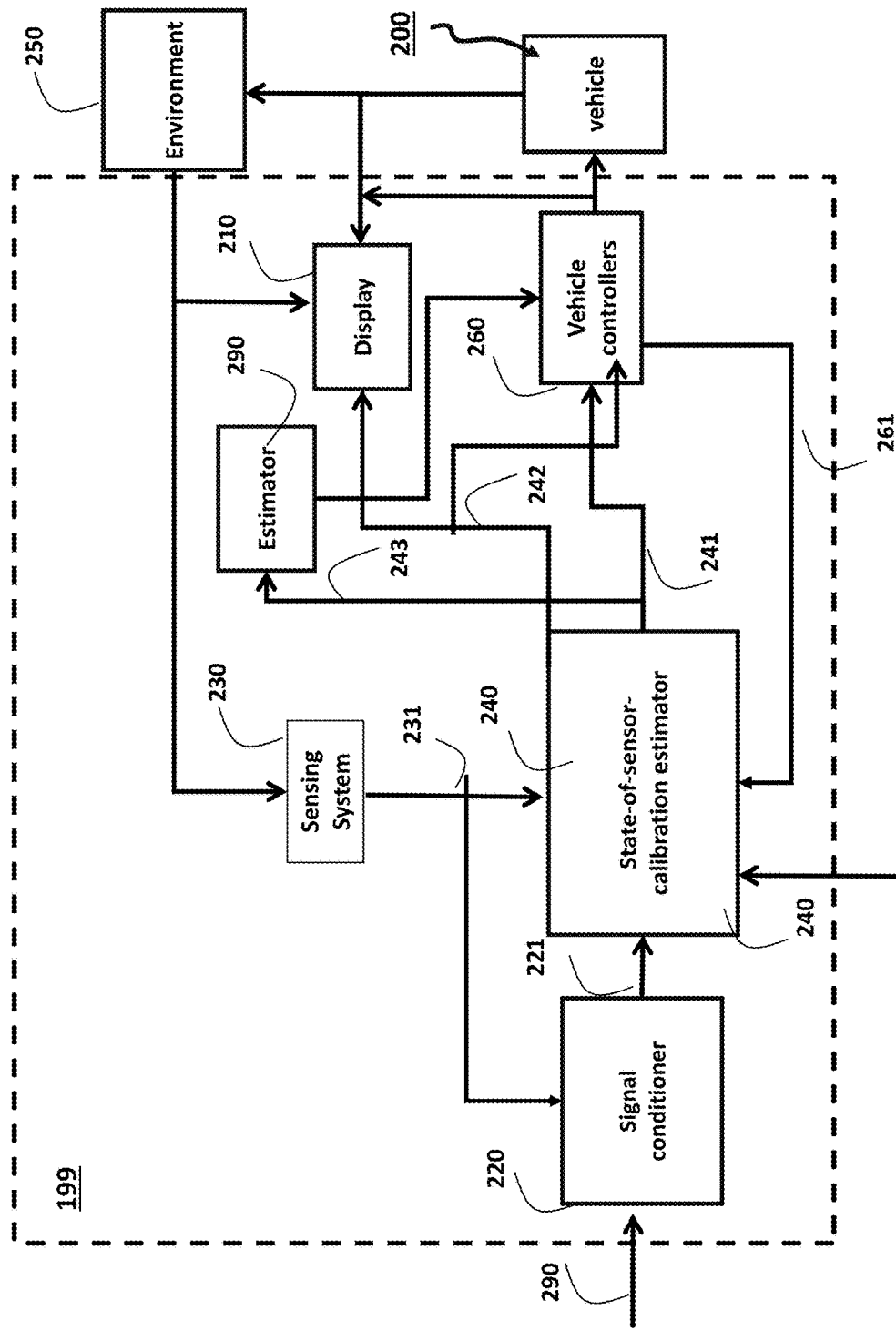
FIG. 2A is a schematic of a general control system for controlling a vehicle.

FIG. 2A illustrates a general block diagram of a control system 199 for controlling a vehicle 200. Different component of the control system 199 can be implemented using one or several processors operatively connected to a memory and/or various types of sensors of the vehicle. As used herein, a vehicle can mean any wheeled vehicle, including a passenger car, a bus, or a mobile robot. The vehicle can be an autonomous vehicle, semi-autonomous vehicle, or a standard vehicle equipped with active safety systems such as electronic stability control (ESC) and/or ABS. The control system 199 can be internal to the vehicle 200 and the implementation of the different components of the control system 199 can depend on the type of the vehicle. For example, depending on the type of the vehicle, the components of the vehicle 260 can vary.

The control system 199 receives information 290 and produces estimates of the wheel speed for some or all wheels 221. The information 290 can include wheel-speed measurements from ABS, engine torque and rotation speed, and/or brake pressure. The control system 199 can also include a sensing system 230 that measures inertial components of the vehicle, such as rotation rate of the vehicle and acceleration of the vehicle, using an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 199. The sensing system 230 can also receive global position information from a global positioning system (GPS) or equivalent.

The control system 199 also includes a sensor calibrator 240 for determining parameters of the state of calibrations, for example, the sensors in 230. In some embodiments of the invention, the state-of-sensor estimator iteratively determines the state of the vehicle and the parameters of the sensor characteristics consistent with the state of calibration, from a state of the vehicle and parameters of the sensor characteristics determined during previous iterations. As used herein, a state of the vehicle includes velocity and heading rate of the vehicle, but can also include a position, heading, and additional quantities related to the motion of the vehicle.

The state-of-sensor estimator 240 uses information 231 from the sensing system and/or wheel-speed estimates 221 from the signal conditioner. If the sensing system 230 is equipped with an IMU for measuring the longitudinal acceleration of the vehicle, the measurements from the IMU can be used to determine parameters related to the longitudinal motion of the vehicle. However, if the sensing system 230 does not possess information about longitudinal acceleration, the signal conditioner 220 can output an estimate 221 of the longitudinal acceleration based on the wheel-speed estimates and other quantities according to other embodiments. Additionally, or alternatively, the state-of-sensor estimator 240 can determine an estimate of the longitudinal acceleration based on the wheel-speed information 221. In one embodiment of the invention, the states of the vehicle and parameters of the sensor characteristics are estimated iteratively by combining wheel-speed, steering angle, and IMU information. In another embodiment of the invention, the sensor calibration system only includes lateral components. In such a case, the information 221 can include necessary information for the longitudinal motion. The state-of-sensor estimator 240 can also receive information 261 about the vehicle motion from the vehicle-control units 260. The information can include a state of the vehicle, such as position, heading, velocity, and is received either from hardware or software, connected directly or remotely to the machine.

For example, the state-of-sensor estimator can output the state of calibration 241 including offset values, certainty levels of the offsets, and variances of the noise of the measurements, or combinations thereof. The control system 199 also includes vehicle controllers 260 that use the state of calibration information 241. For example, in one embodiment, the offset is used in an advanced driver-assistance system (ADAS) that utilizes a model of the dynamics of the vehicle, which depends on the state of offsets of the sensors. The vehicle controllers 260 can include stand-alone components, such as ABS, ESC, or ADAS, or a combination of vehicle controllers that enable autonomous driving features. For example, the state-of-sensor estimator can output state of calibration 242 related to the wheel radius offset estimate to be displayed on a display 210 of the vehicle as supervisory components to a driver of the vehicle, to alert the driver of loss of tire pressure. Additionally, or alternatively, the offsets and variances, which describe the state of calibration, can be used as input to estimators 290 of the vehicle, for example, a state estimator.

Figure 2B:
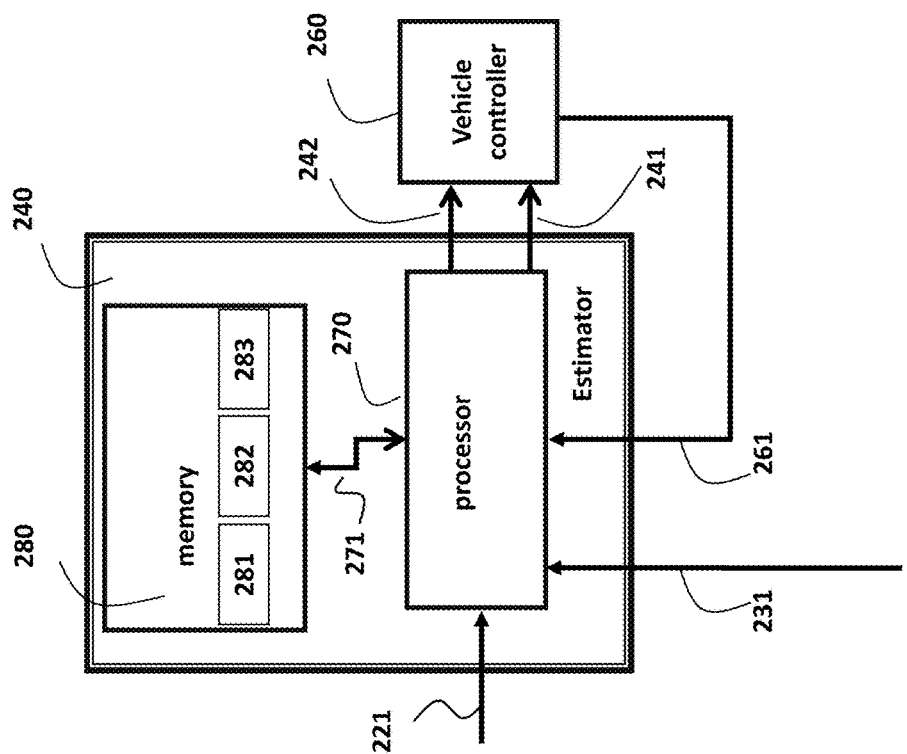
FIG. 2B is a diagram of a general structure of a system according to one embodiment of the invention.

FIG. 2B shows a general structure of the state-of-sensor estimator 240 according to one embodiment of the invention. The state-of-sensor estimator 240 includes at least one processor 270 for executing modules of the state-of-sensor estimator 240. The processor 270 is connected 271 to a memory 280 that stores the statistics 281 of the states and parameters and the vehicle information 282, such as the motion model of the vehicle and a measurement model of the vehicle, wherein the motion model of the vehicle includes a combination of a deterministic component of the motion and a probabilistic component of the motion, wherein the deterministic component of the motion is independent from the state of calibration and defines the motion of the vehicle as a function of time, wherein the probabilistic component of the motion includes the state of calibration and defines disturbance on the motion of the vehicle, wherein the measurement model of the vehicle includes a combination of a deterministic component of the measurement model independent from the state of calibration and a probabilistic component of the measurement model that includes the state of calibration. The memory 280 also stores 283 the internal information of the estimator, including, but not limited to, values of the state of calibration, values of each computed state of the vehicle, and the motion leading up to each state of the vehicle. In some embodiments, the information on the vehicle is updated 271 based on information received from the vehicle 261 and the sensing 231.

Some embodiments of the invention rely on the realization that the state of calibration can be determined by jointly and iteratively estimating the state of the vehicle and the state of calibration that best describe the state of the vehicle in a probabilistic framework, instead of trying to find the parameters associated to the sensor by relying on tedious optimization algorithms. That is, the state of calibration can be estimated by considering the probability that a certain parameter value explains the state estimate, determined during previous iterations.

For example, some embodiments use a probabilistic motion model of the vehicle, wherein the sensor is expressed as stochastic disturbances on the motion of the vehicle, wherein the offset is modeled as the statistical mean and the variance around the statistical mean expresses the measurement noise of the sensor, wherein the selection of the set of parameters can be determined according to optimizing some probabilistic cost function. The cost functions are selected according to other embodiments of the invention.

Figure 3:
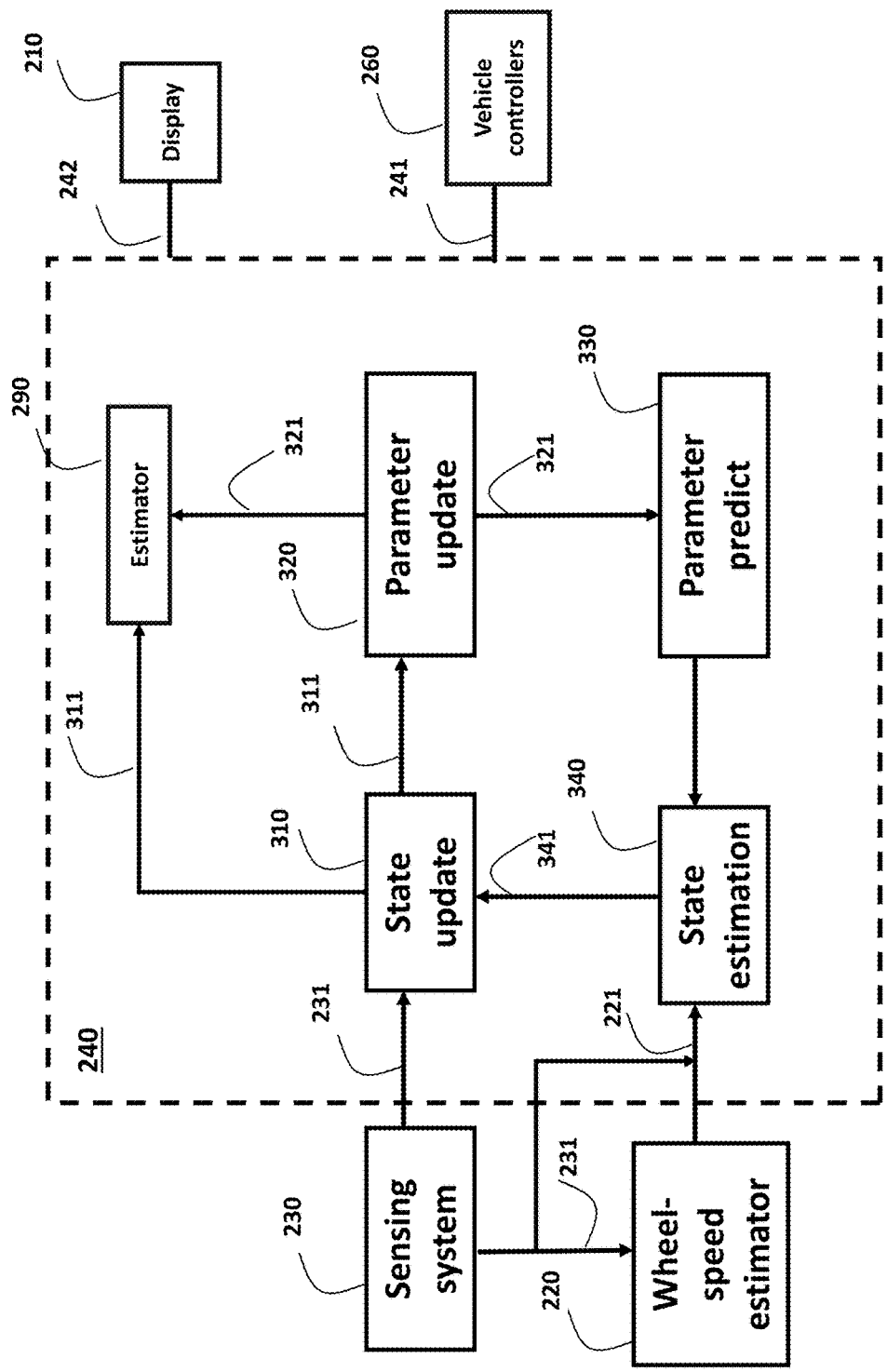
FIG. 3 is a schematic of real-time calibrator estimator according to some embodiments of the invention.

FIG. 3 shows a schematic of the state-of-sensor calibration estimator 240 according to some embodiments of the invention. The estimator 240 uses wheel-speed measurements 221, or their estimates, to estimate 340 future states 341 of the vehicle. In some embodiments, the state estimation 340 uses a model of the motion (dynamics) of the vehicle, wherein the model depends on the state of calibration. The model can include both longitudinal and lateral dynamics, in which case both longitudinal and lateral sensor parameters are included in the state of calibration. Alternatively, the model can include only one of the longitudinal and lateral dynamics. The state update module 310 uses measurements 231 from a sensing system 230 to correct the state estimation 341 to form an updated 311 state of the vehicle.

In one embodiment, the updated state 311 and/or the estimation 341 is used as the input 241 to a vehicle-control system 260. Additionally, or alternatively, in another embodiment, the state estimate 311 is used to update 320 at least one parameter of the state of calibration, resulting in updated parameters 321 of state of calibration of the vehicle. In one embodiment, the updated parameters 321 are used as inputs 241 to a vehicle-control system 260. Additionally, or alternatively, in another embodiment, the updated parameters 321 are used as inputs 242 to the display 210 to serve as a supervisory component to the driver, for example, to detect loss of tire pressure. Additionally, or alternatively, in another embodiment, the updated parameters 321 are used to update 330 the model of the motion of the vehicle for estimating the state 340, thus concluding one iteration of some embodiments of the invention. Additionally, or alternatively, the parameters 321 can be used in other estimator 290 for estimating various aspects in relation to the vehicle motion.

In the present invention, one embodiment realizes that the model of the motion of the vehicle can be formulated as one deterministic part, which is entirely determined by the state of the vehicle, and one uncertain part, where the uncertain part is entirely dependent on the state of calibration. In another embodiment, it is realized that the measurement model of the state of the vehicle can also be formulated as one deterministic part, which is entirely determined by the state of the vehicle, and one uncertain part, where at least parts of the uncertain part is dependent on the state of calibration.

Accordingly, in some embodiments, it is acknowledged that the state of calibration can be determined by deducing the state of calibration from the relationship between the state of the vehicle, the state of calibration, and the motion model of the state of the vehicle, and the relationship between the measurements of the state, the measurement model of the state of the vehicle, and the state of calibration that is describing the stochastic part of the measurement model. It is a key observation in one embodiment of the invention that estimating the state of calibration can be done without having a model of the motion (time evolution) of the state of calibration, which is unknown, and that the uncertainty of the measurements is given by the variance that describes the stochastic distribution of the state of calibration.

In some embodiments, the state of the vehicle evolves dynamically in time according to a model of the motion of the state of the vehicle. If choosing the model of the motion of the vehicle and the model of the inputs to the vehicle carefully, the motion of the state of the vehicle can be described as one deterministic part, which is entirely determined by the state of the vehicle, and one uncertain part, where the uncertain part is dependent on the state of calibration vehicle. For example, the model of the motion of the vehicle can be described according to some nonlinear function $x_{k+1} = f(x_k, u_k) + g(x_k, u_k) w_k$, where $f \in \mathbb{R}^n$ is a nonlinear deterministic function describing the evolution of the state of the vehicle, $g \in \mathbb{R}^{n \times d}$ is a nonlinear deterministic function dependent on the state of the vehicle. mapping the disturbances $w_k \in \mathbb{R}^d$, k is the discrete time index, $x \in \mathbb{R}^n$ is the state, and $u_k$ contains the inputs to the system. The dynamic model of the motion of the vehicle depends on the state of calibration, including the offset, mean of the sensor, variance of the sensor. In some embodiments, the disturbance $w_k \in \mathbb{R}^d$ affecting the motion of the vehicle is due to uncertainties in the numerical description of the state of calibration, in other embodiments it is due to an uncertainty in the offset, in yet another embodiments it is due to the uncertainty in the variance, or both mean and variance. In other embodiments, the state of the vehicle includes a velocity vector and a heading rate of the vehicle.

Figure 4A:
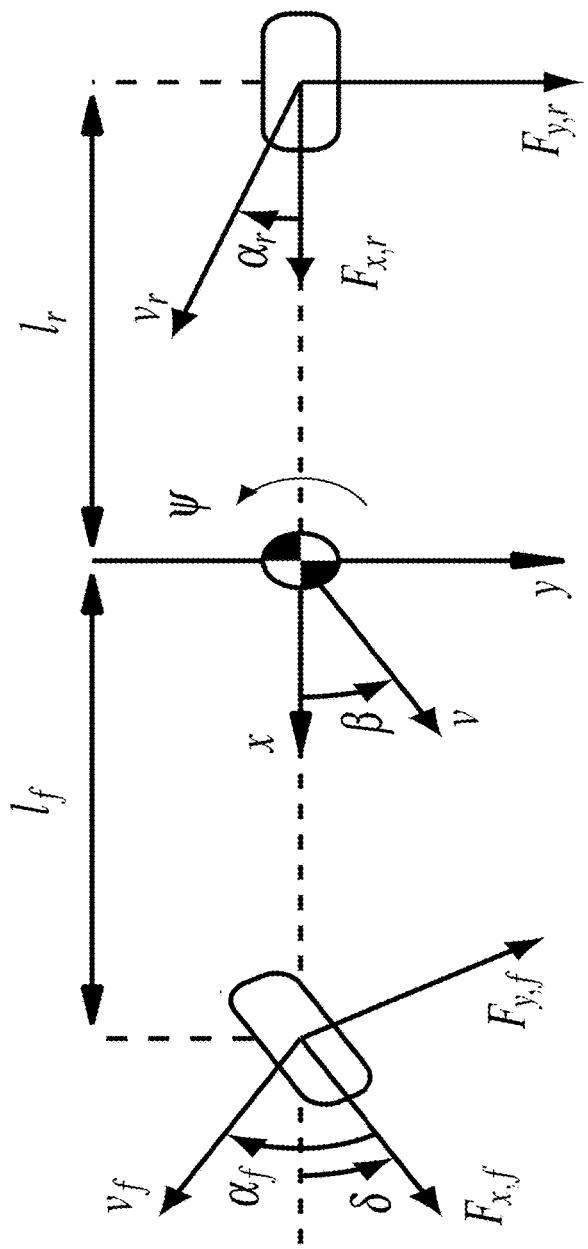
FIG. 4A is a schematic of a simplified vehicle model used by some embodiments.

FIG. 4A shows a schematic of a simplified front-wheel drive single-track model of the vehicle, in which the two wheels on each axle are lumped together. This vehicle model in general at least depends on the state of calibration of the steering wheel sensor and the state of calibration of the wheel rotation rates.

Figure 4B:
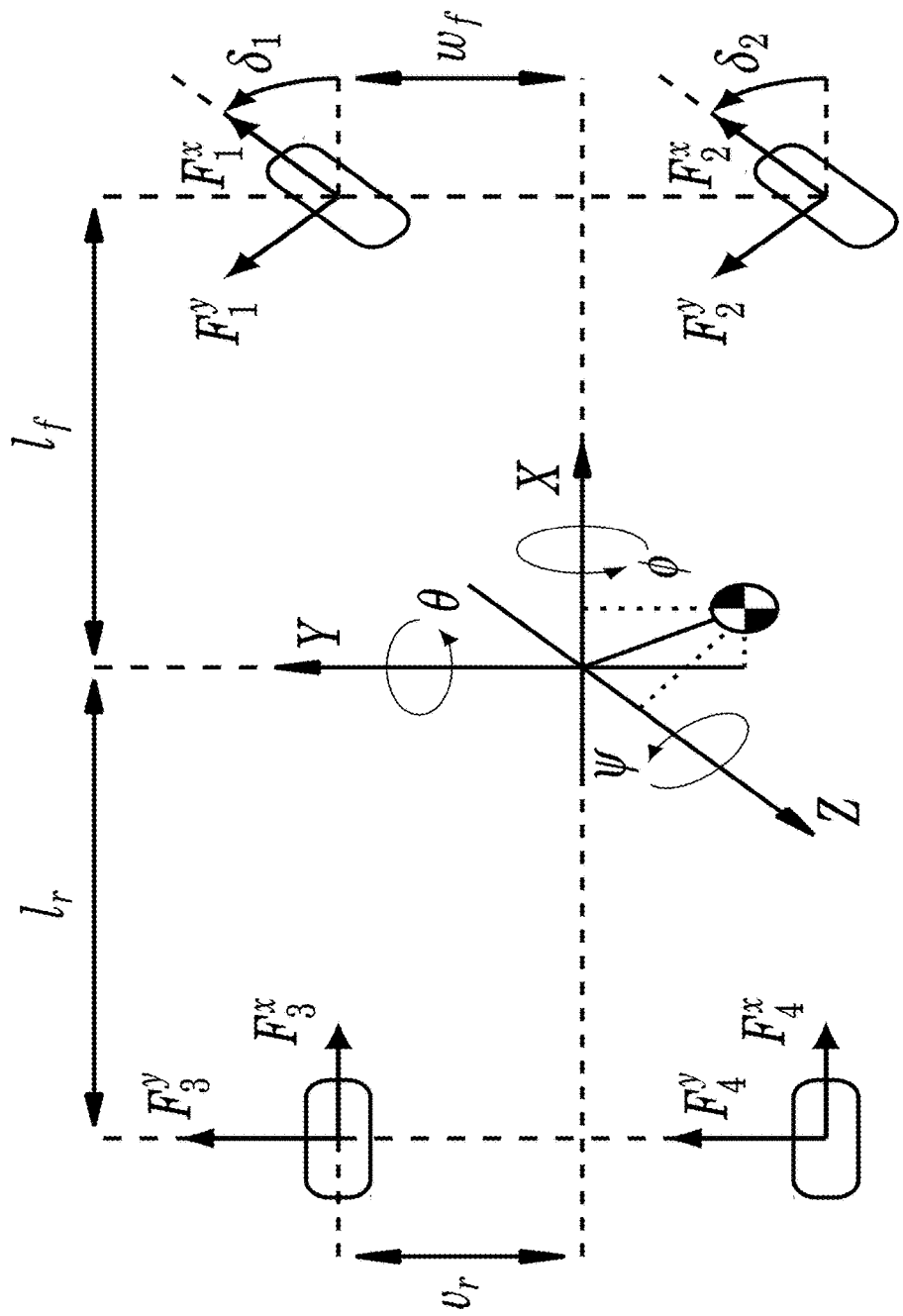
FIG. 4B is a schematic of a full-order vehicle model used by some embodiments.

For example, the state of calibration of the steering wheel angle can be written as where $\delta = \delta_m + \Delta\delta$, where $\delta_m$ is the true measurement and $\Delta\delta$ is the time-varying, unknown part. One embodiment defines $w_k := \Delta\delta$ as random disturbance acting on the otherwise deterministic system. In some embodiments, the noise term is Gaussian distributed according to $w_k \sim \mathbb{R}(\mu_k, \Sigma_k)$, where $\mu_k, \Sigma_k$ are, in general, time varying, mean and covariance of the state of calibration, the offset and noise variance. FIG. 4B shows a schematics of a full chassis model with front steering. In such a case, the number of parameters to be estimated increases, but it is to be understood that the same method applies.

One embodiment of the invention chooses the inputs to the system as the wheel-speed estimates 221, averaged over each wheel axle. In another embodiment, the inputs are the wheel-speed estimates 221 in combination with the steering angle of the wheels 231, averaged over each wheel axle. In nonautonomous mode, sometimes the steering angle of the wheel cannot be measured, but the steering angle of the steering wheel can be measured. Yet another embodiment transforms the steering angle of the steering wheel to the steering angle of the wheels, by considering gear ratios of the mechanical construction connecting the steering wheel with the wheels.

In terms of a probability density function (PDF), with the definition $\theta_k := \{\mu_k, \Sigma_k\}$, the dynamical system can be described as $p(x_{k+1} | x_k, \mu_k, \theta_k)$. Some embodiments rely on the realization that determining the state of the vehicle and the state of calibrations can be done by determining the PDF of the total system, given measurements and model of the motion and model of the measurements.

To determining the PDF of the system, several embodiments of the invention define the measurements to the system 231 from the sensing system 230 uncertain both with respect to offsets and to variances. For example, if one measurement is the heading rate $\dot\psi$, and if the state of the vehicle contains the heading rate, the measurement $\dot\psi_m$ is related to the heading rate through the deterministic part relating the heading rate measurement to the state and $e_k \sim \mathbb{R}(b_k, R_k)$, where $b_k$ is the offset term because of drift in the sensor, and $e_k$ is the stochastic distribution of the state of calibration modeled as a Gaussian distribution corrupted by the offset and the variance $R_k$, which is in general a covariance matrix. In general, both of the offset and variance are unknown. In one embodiment, the measurement model can be written as $y_k = h(x_k, u_k) + d(x_k, u_k)(\delta_m + w_k) + e_k$, where also inputs other than $\delta_m$ can be added, thus adding more state of calibrations that affect the motion model, and more parameters to estimate.

The noise source accounts for that the measurement is not perfect. The noise source can be chosen in several ways. In one embodiment, the yaw rate and acceleration commands are combined to form a vector of measurements, at each time step, all with individual offset and variance components. In some embodiments, the system is estimated by estimating iteratively the three PDFs $p(\theta_k | x_{0:k} \bar{y}_{0:k}) p(x_{0:k} | \bar{y}_{0:k})$, whereby after estimating the said PDFs, the state of the vehicle and the state of calibration can be reconstructed. Some other embodiments represent the continuous PDFs using N discrete weights, which as N gets large enough, exactly represent the continuous PDFs. The PDF of the state of the vehicle is then represented by N hypotheses of the state of the vehicle, and the statistics of the other PDF can be represented using either approximate techniques or exact techniques. For example, the PDF of the state of calibration can be updated using sampling-based techniques or using Normal-inverse-Wishart update techniques. The accuracy of the different representations depends on the particular model of the dynamical evolution and the particular modeling of the involved measurements.

Some embodiments acknowledge that the state of calibrations can be accurately estimated, by considering the state of calibrations and state of the vehicle jointly. In one embodiment, the quantities are estimated by assigning probabilities to how likely the combination of the quantities explains the measurement vector.

Figure 5A:
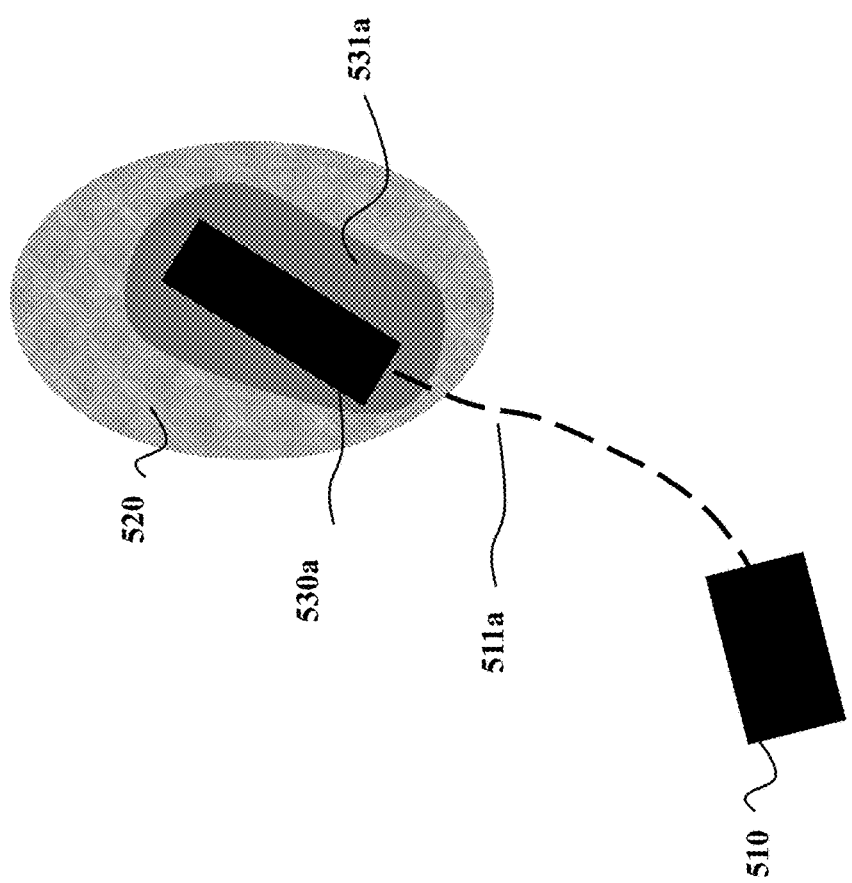
FIG. 5A is an illustration of assigning probabilities to a particle according to some embodiments.

FIG. 5A illustrates a scenario where the vehicle has an initial state 510. For one set of offsets and an input to the system, the vehicle obeys the motion 511a and ends up in 530a, with resulting uncertainty 531a due to the uncertainty in the state of calibration affecting the vehicle motion. The uncertainty of the sensing system 230, that is the variance that is estimated, leads to that the state of the vehicle can only be known up to a certain area 520. However, the end state of the vehicle 530a well resides within the area 520, so this particular combination of state of calibration and initial state of the vehicle, is given a high probability of being a good combination.

Figure 5B:
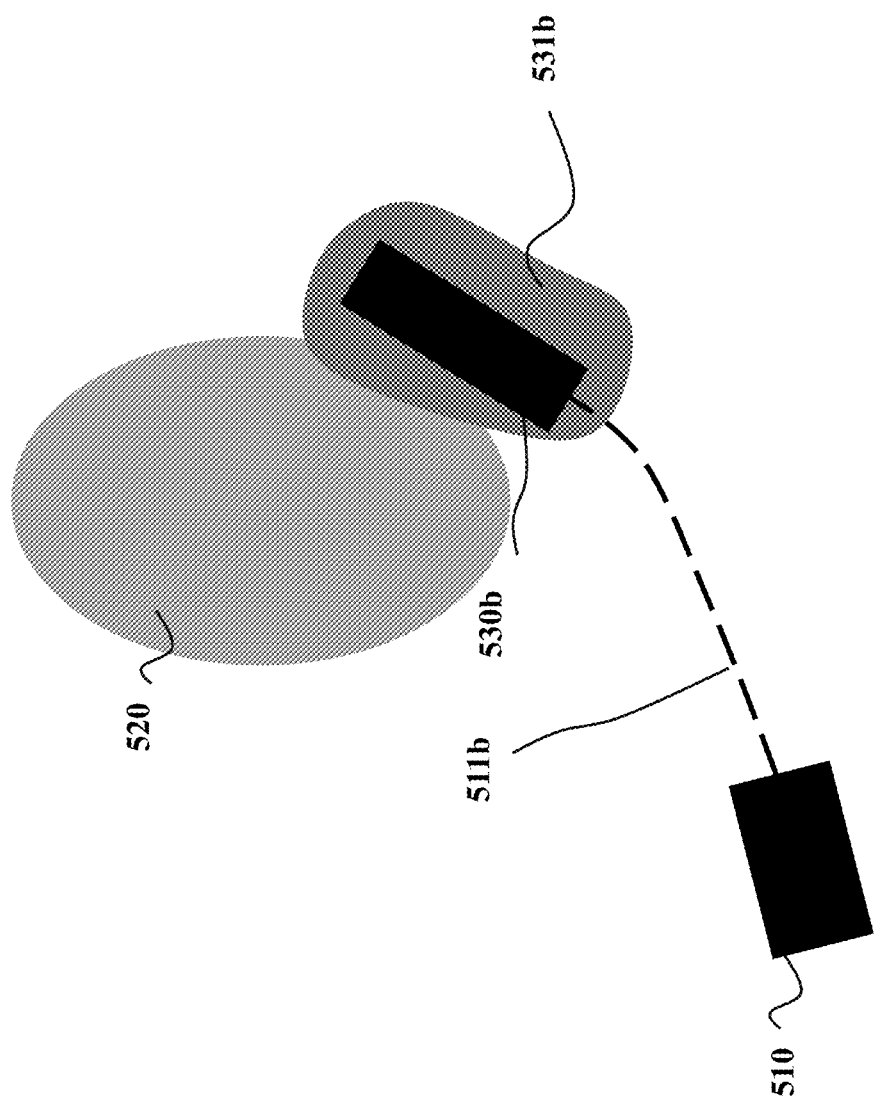
FIG. 5B is an illustration of assigning probabilities to a particle according to some embodiments.

FIG. 5B shows a vehicle with the same initial state 510 with another set of state of calibrations affecting the motion model. For the same inputs to the system, the vehicle 510 now obeys the motion 511b, leading to that the vehicle ends up in state 530b, with resulting uncertainty 531b of the state of calibration affecting the motion model. However, this end state 530b of the vehicle does not reside within the certainty area of the state of calibration affecting the measurement model. Thus, this particular combination of initial state and state of calibrations is assigned a low probability of being a good combination.

Figure 5C:
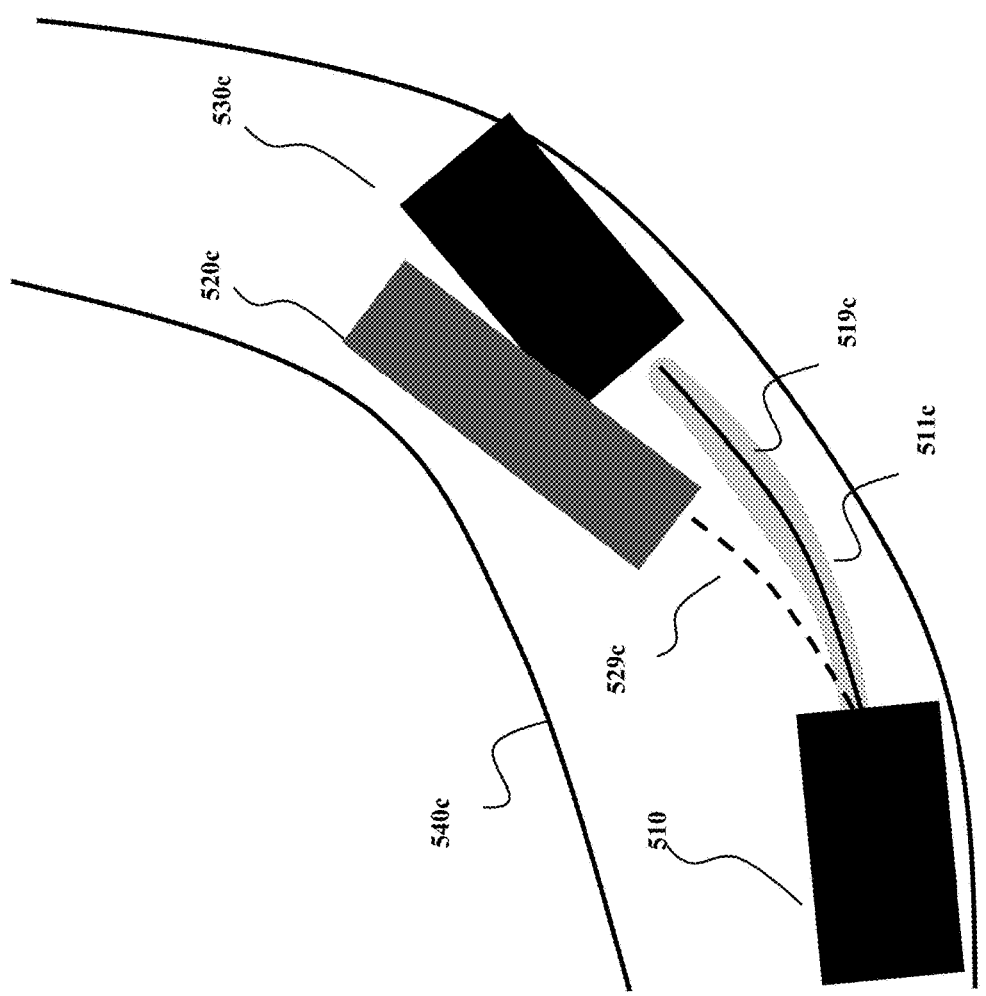
FIG. 5C is a schematic of different motions determined according to some principles employed by some embodiments.

FIG. 5C shows a schematic of different motions determined according to some principles employed by various embodiments of the invention. The vehicle is estimated to be at the current state 510 on a road with road boundaries 540c, where the estimates of the current state 510 has been determined during previous iterations according to other embodiments of the invention. The lines 519c and 529c are two different motions determined using two different states of sensor affecting the motion model, leading to two possible states 520*c* and 530*c* of the vehicle. The gray area 511*c* indicates the uncertainty of the state of calibrations affecting the measurement model, coining from the sensing system 230, that is, the possible area where the motion is likely to occur, determined from the estimated state of calibrations affecting the measurement model determined during previous iterations. Only the motion 519*c* is inside the uncertainty region. Hence, the state 520*c* resulting from the motion 529*c*, and the state of calibration associated with the motion 529*c*, are given a low probability of being a good combination.

Figure 5D:
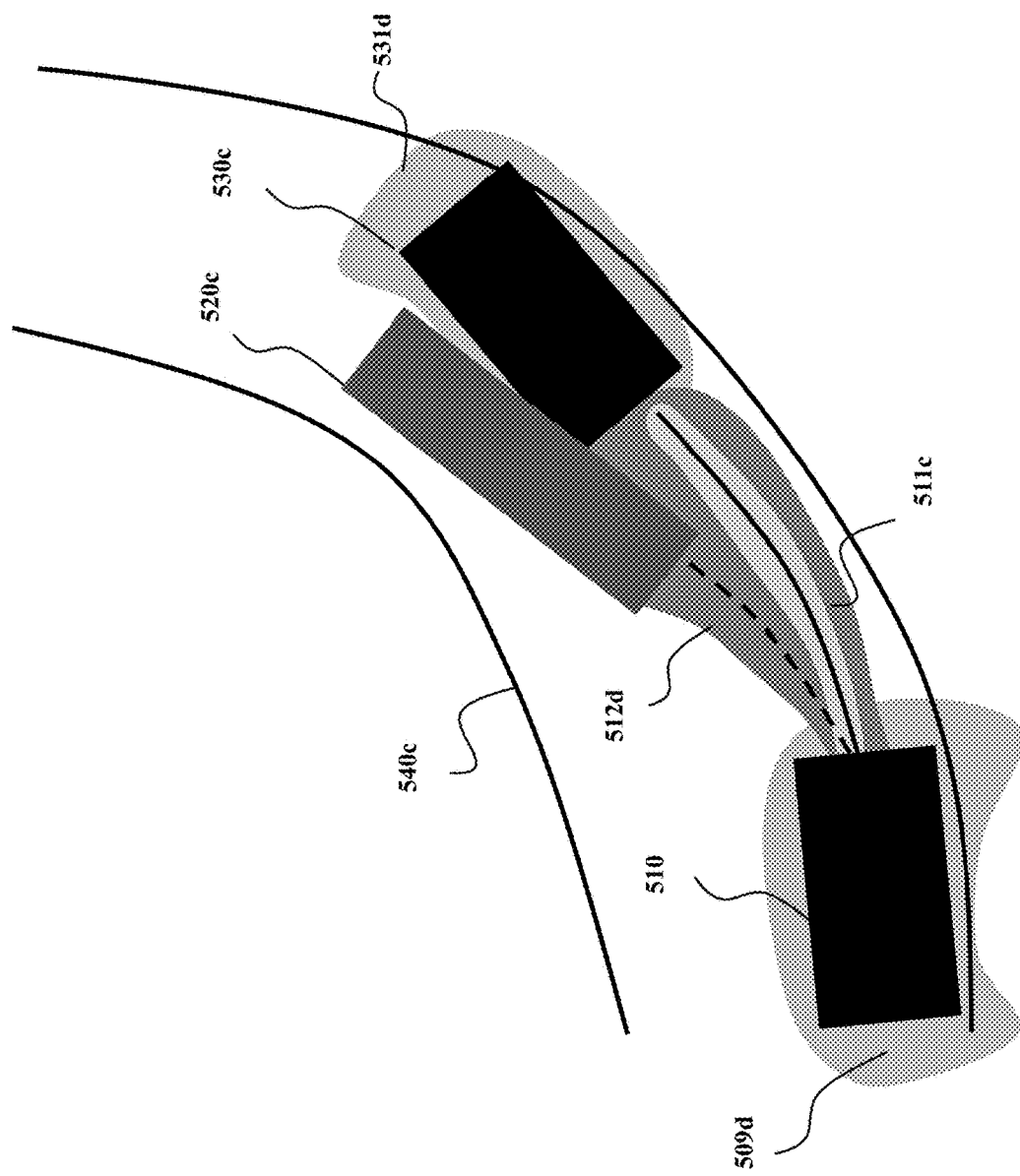
FIG. 5D is a schematic of different motions and associated probability distributions determined according to some principles employed by some embodiments.

As shown in FIG. 5D, the motion of the vehicle can be modeled in the form of a PDF 512*d* over the state of the vehicle, wherein the initial condition 509*d* of the PDF 512*d* has been determined during previous iterations by other embodiments of the invention. In some of the embodiments of the invention, the motion is computed by; first determining several motions from initial states to end states, where the different motions are initiated according to the set of parameters of the state of calibration affecting the motion model belonging to that particular motion; second, determining how the different motions agree with the true motion sensed by the sensing system 230; third, determining parameters that are consistent with the determining how the different motions agree with the true motion sensed by the sensing system. To illustrate, FIG. 5D shows a situation where two different parameters of the state of calibration affecting the motions lead up to states 520*c* and 530*c*, respectively, and the PDF 512*d* of the motion of the vehicle both agree with the respective motions. However, after determining how the different motions agree with the PDF 511*c* of the sensing system, where the PDF 511*c* is dependent on the state of calibration affecting the measurement model, the PDF 531*d* is achieved, which does not agree with the state 520*c*. In some embodiments, the PDF 531*d* is determined by a combination of the estimates at a previous iteration and the measurement from the sensing system. In certain embodiments of the invention, the resulting PDF 531*d* forms the basis for another iteration of the method.

Some embodiments determine a probability of each particle to represent a true state of the sensor based on a difference between the state of the vehicle estimated using the state of calibration of the particle affecting the motion model, the state of the sensor affecting the measurement model, and the measured state. For example, one embodiment determines such a probability using the PDF of the state of the vehicle. In other embodiments, the state of the sensor affecting the motion model and the state of calibration affecting the measurement model are partially the same. For instance, the state of the steering angle sensor affects the motion model of the vehicle and the measurement model of the vehicle, but the state of the lateral acceleration sensor only affects the measurement model.

Figure 6A:
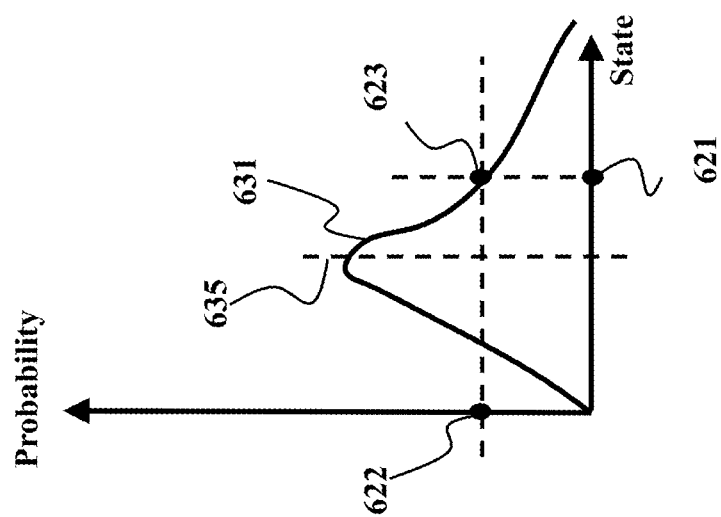
FIGS. 6A and 6B are graphs illustrating selection of the probability of the sampled parameters used by some embodiments.

FIG. 6A shows a graph illustrating selection of the probability of the sampled parameters using the PDF 631 over possible states of the vehicle according to one embodiment of the invention. For example, the PDF 631 can be a probability distribution of the measurement model. The shape of such a probability distribution can be determined in advance, e.g., as a Gaussian or different shape, and the location of this probability distribution 631 is centered on the measured state 635. However, the parameters, that is, the offset and variance of the sensor, can be unknown. To that end, one embodiment determines a probability distribution of the state of the vehicle and/or the state of the sensor using a probability distribution 631 of the measurement model centered on the measured state. To that end, the embodiment can determine the probability of each particle to represent the true state of the sensor according to a placement of the mean in the particle on the probability distribution of the state of the vehicle and the state of the sensor.

For example, the embodiment submits the initial state and one sample of the parameter values to the model of the motion of the vehicle to estimate a transition of the vehicle from the initial state to a next state 621 and selects a value 622 of the PDF over states of the vehicle at a point 623 corresponding to the next state 621 as the probability of the state of the vehicle and/or the state of the sensor to be accurate.

Figure 6B:
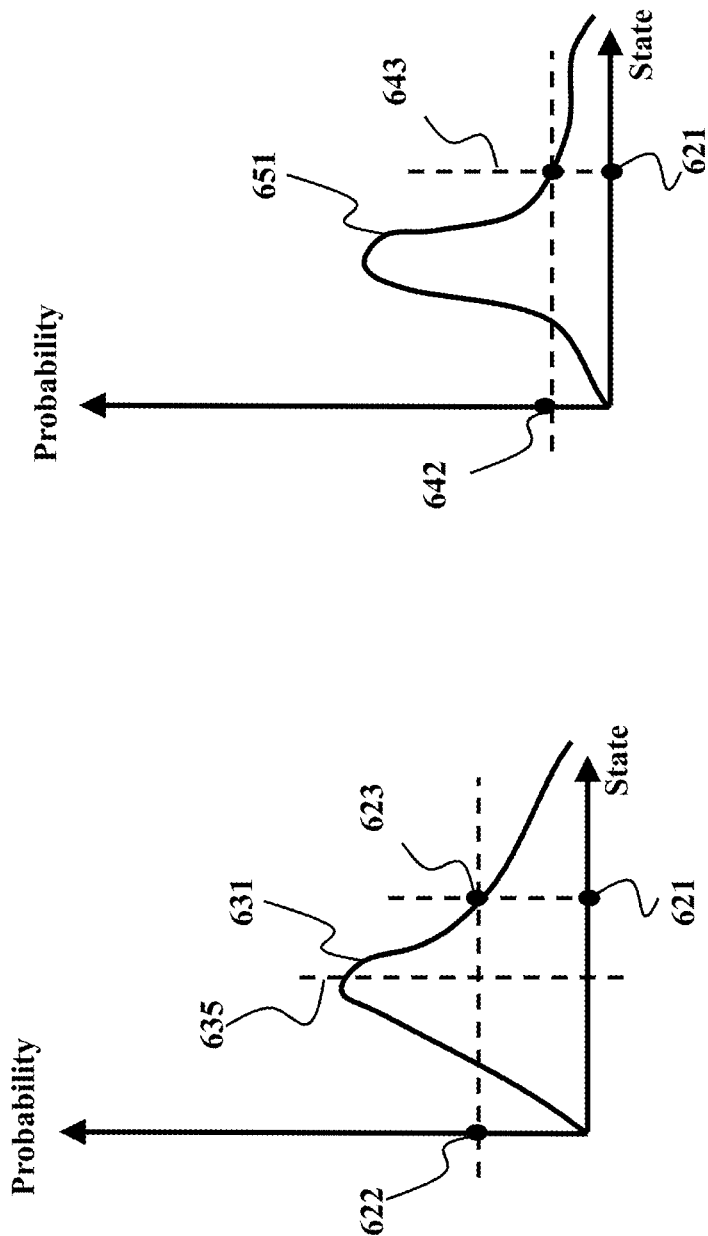

FIG. 6B shows another graph illustrating selection of the probability of the sampled parameters according to PDF 651, which is different from the PDF 631 of FIG. 6A. For example, the PDF 651 is the distribution updated based on a change of the measured state. In this example, the embodiment selects a value 622 of the PDF 651 over states of the vehicle at a point 643 corresponding to the next state 621 as the probability of the state of the vehicle and/or the state of the sensor.

Figure 7A:
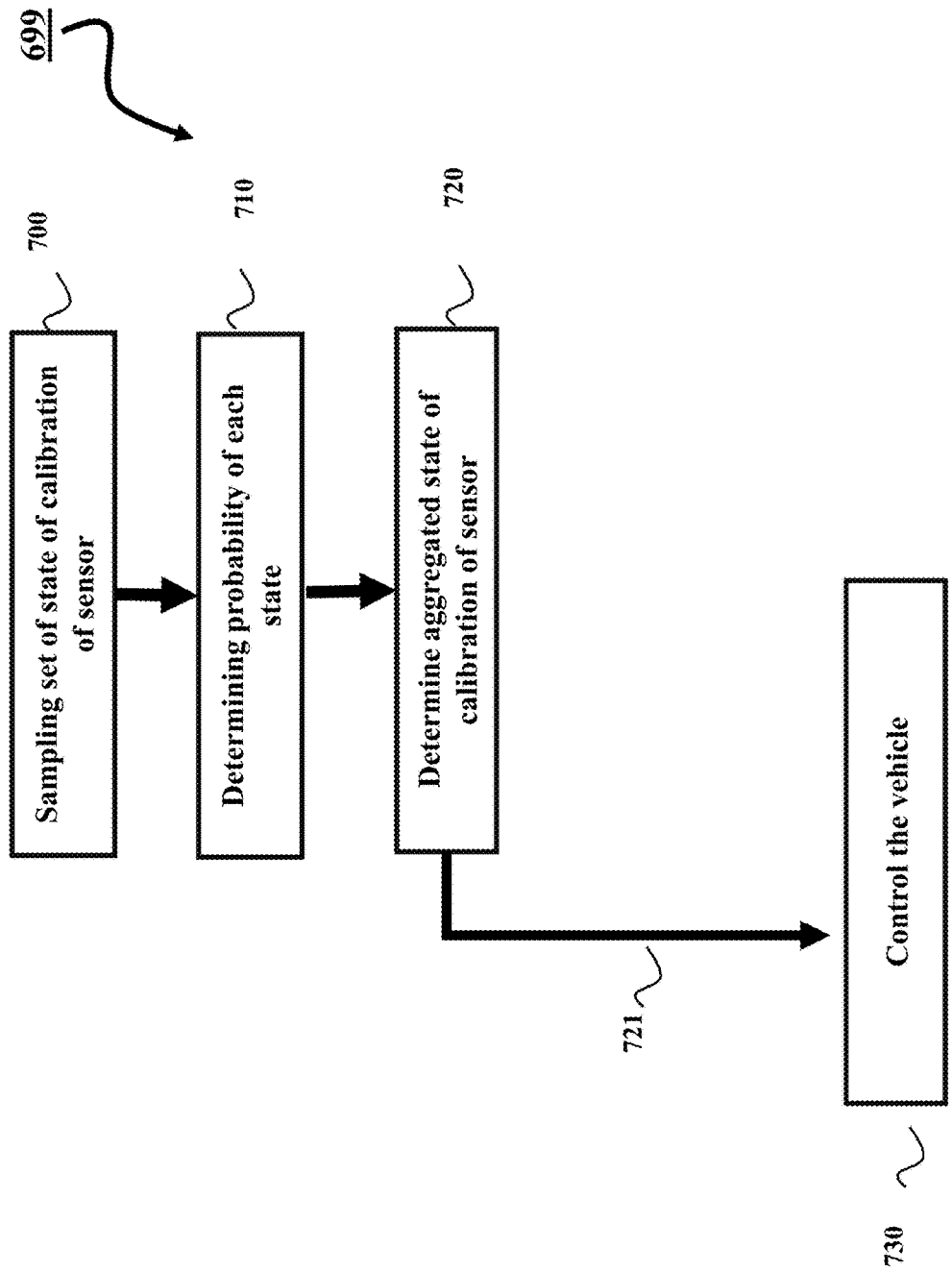
FIG. 7A is a flowchart of one iteration of a method for estimating the state of calibration and state of the vehicle, and for controlling the vehicle according to some embodiments of the invention.

FIG. 7A shows a flowchart of one iteration of a method 699 for estimating the state of calibration and state of the vehicle, and to control the vehicle according to some embodiments of the invention. The method determines a set of parameter values and associated uncertainties, specifying the model of the vehicle, and state of the vehicle that explains the motion of the vehicle, starting from an initial state and an initial set of parameters. In different embodiments, the initial state of the vehicle is a current estimated state of the vehicle and/or wherein the initial state of the vehicle is the state of the vehicle corresponding to the state of calibration determined during a previous iteration of the method.

The motion is defined by the state transitions connecting states of the vehicle, for example, as shown in FIG. 5A for a motion connecting two estimated states of the vehicle. Each state includes at least a velocity and a heading rate of the vehicle. Steps of the method are performed by a processor 270 of the estimator 240 and/or of the vehicle. The motion is determined iteratively until a termination condition is met, for example, for a time period or for a predetermined number of iterations. An iteration of the method of FIG. 7A includes the following steps.

The method 699 determines 700 a set of sampled states of sensor affecting the motion model and a corresponding set of transitions to a set of states satisfying static and dynamic constraints on the state of the vehicle. For example, the method determines the state transitions 519*c*, 529*c*, and the states 530*c*, 520*c*, in FIG. 5C. Next, the method 699 determines 710 the probability of each state of calibration sample in the step 700 to produce movement to a state consistent with the measurements of the motion of the vehicle.

Using the probability of each state as the probability of the particle of the state of calibration used to estimate those state, the method 699 determines 720 the aggregated state of calibration 721 according to the function that uses a weighted combination of the updated mean and the updated variance in each particle. For example, the weights in the combination are determined by the probability of each particle to represent the true state of the sensor. Additionally, or alternatively, the function can just select the state of calibration of the most likely particle. Other embodiments use different function for determining the state of calibration 721, which can be used to control 730 the vehicle.

Figure 7B:
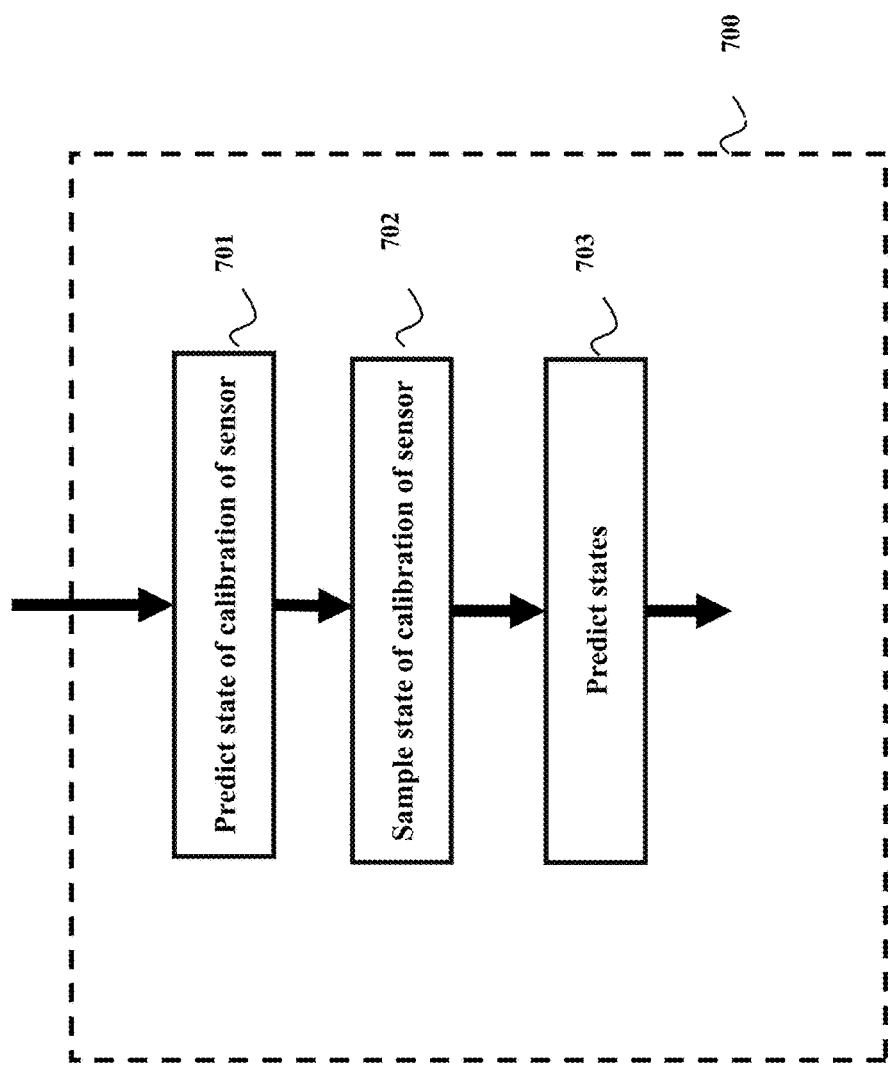
FIG. 7B is a flowchart of an exemplar implementation of the determining the set of states of sensor of the method of FIG. 7A according to one embodiment.

FIG. 7B shows a flowchart of an exemplar implementation of the determining 700 the set of states of sensor values according to one embodiment of the invention. The determining 700 uses the actual inputs to the system, the estimated offset and variance of the state of calibration affecting the motion model, and initial states estimated using previous iterations. The method first predicts 701 N means and variance for the set of particles $\{\mu_k^i, \Sigma_k^i\}_{i=1}^N$ from values of the offset and variance determined during previous iterations. Then, the method samples 702 a set of N values of the state of calibration, where N can be predetermined or made adaptive, and predicts 703 the states $\{x_k^i\}_{i=1}^N$ using the set of values of the state of calibration.

In some embodiments of the invention, each value number i of the state of calibration is generated using number i of $\{\mu_k^i, \Sigma_k^i\}_{i=1}^N$, which is a set of the offset, mean, and variance, that is, noise-source parameters of the dynamical system, that is, $w_k$, where $\mu_k^i$ denotes the estimated mean of the state of calibration and $\Sigma_k^i$ the corresponding uncertainty, or variance. For example, $w_k$ can be chosen as arising from a Gaussian distribution $w_k \sim \mathbb{R}(\mu_k, \Sigma_k)$, or can be chosen as a PDF tailored to the particular application. In some embodiments, to account for the uncertainty in the mean and variance estimates themselves, a student-t distribution is used, which approaches the Gaussian for every iteration.

In some embodiments of the invention, the sampled parameter values 702 are generated by inverting the dynamical system. In such a case, in one embodiment, the states $\{x_k^i\}_{i=1}^N$ are instead generated by using a probabilistic function $q(x_k|x_{k-1}, y_k)$, and the sampled state of calibration values are generated by inverting of the dynamical system to better satisfy the measurements. However, inverting the system model cannot always be done exactly. This approach can also be used for the case when the state of calibration only affects the motion model.

Figure 7C:
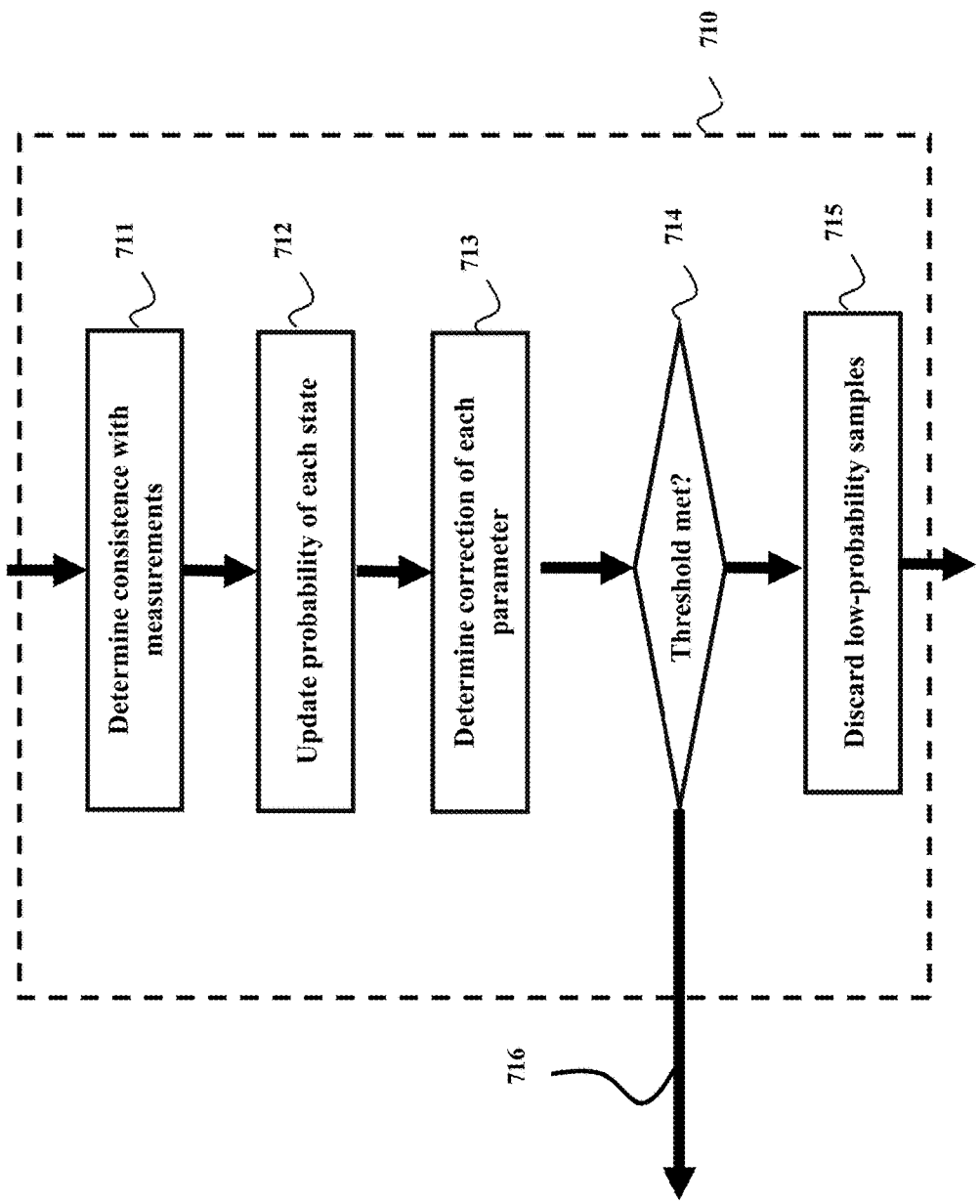
FIG. 7C is a flowchart of an exemplar implementation of the determining the probability of each sampled state of calibration of the method of FIG. 7A according to one embodiment.

FIG. 7C shows a flowchart of the method 710 that determines the probability of each sampled state of calibration producing movement to a state consistent with the measurements of the motion of the vehicle, and also determines the state of calibration affecting the measurement model, which however is not sampled. When determining the probability of each parameter of state of calibration value, the consistence of the next state 702 with the measurement is determined 711 and the probability of each state is computed 712. For example, one embodiment determines the probability 712 using principles described in FIGS. 6A and 6B.

In one embodiment of the method 710, if the so-called effective sample size is below a threshold 714, where the threshold can be predetermined, few state of calibration values have a large probability of leading to a state consistent with the measurements of the motion of the vehicle, so the method duplicates samples and corresponding states with high probability and discards those with low probability 715. Otherwise, the method exits 716. Additionally, or alternatively, in some embodiments, state of calibration values and corresponding states with nonzero but low probability are replaced with inputs and states with higher probabilities. For example, one embodiment generates a new set of state of calibration values and corresponding states in such a way that the probability of generating $x_k^i$ is at least $q_k^i$. In another embodiment, the replacement is performed whenever the inverse square sum of the probabilities is below some predefined threshold. Doing in such a manner ensures that only good states of calibration values are used.

In some embodiments of the invention, the determining 712 is done as a combination of the PDF of the measurements, $p(y_k|x_k^i, y_{0:k-1})$, the PDF of the dynamical system, and the probability $q_{k-1}^i$ of the input determined during previous iterations of the method 700. For example, if state of calibration values are generated according to the uncertainty model of the parameters, the probabilities are proportional to the PDF of the measurements, i.e., $q_k^i \propto q_{k-1}^i p(y_k|x_k^i, y_{0:k-1})$. In one embodiment, the probabilities are normalized in such a way that they represent a PDF. Relating to FIG. 6B if $q_{k-1}^i$ is given by the value 642 at a point 643 on the PDF 651 determined during previous iterations corresponding to the state 621, the updated probability $q_k^i$ is determined as a multiplication of 622 and 642.

The determining 713 of the state of calibration parameters $\{\mu_k^i, \Sigma_k^i\}_{i=1}^N$ can be done in several ways. For example, one embodiment determines corrected parameters by using the sampled state of calibration value $\bar{w}_k$ to correct each parameter set using the correction module $$\gamma_{k|k} = \frac{\gamma_{k|k-1}}{1+\gamma_{k|k-1}},$$

$$\hat{\mu}_{k|k} = \hat{\mu}_{k|k-1} + \gamma_{k|k} z_k,$$

$$v_{k|k} = v_{k|k-1} + 1,$$

$$\Lambda_{k|k} = \Lambda_{k|k-1} + \frac{1}{1+\gamma_{k|k-1}} z_k z_k^T$$

$$z_k = \bar{w}_k - \hat{\mu}_{k|k-1},$$

Here, the parameters of the state of calibration are corrected from the estimated parameters of the state of calibration determined during previous iterations. From the above equations, we can deduct the value of the state of calibration directly, the uncertainty of the state of calibration can be determined from the equations above. When also updating the state of calibration of the measurements affecting the measurement model, $\bar{w}_k$ is generated as $$\bar{w}_k^j = \begin{bmatrix} w_k^j \\ e_k^j \end{bmatrix} = \begin{bmatrix} g(x_k^j, u_k)^{-\dagger}(x_{k+1}^j - f(x_k^j, u_k)) \\ y_k - h(x_k^j, u_k) - d(x_k^j, u_k)\mu_{w,k}^j \end{bmatrix}$$

Here, the second equation does not necessarily contain sampled state of calibration values. However, the state of calibration of the measurement model is on the left hand side, $e_k^i$, and $\mu_{w,k}^i$ is the statistical mean of the state of calibration affecting both the motion model and the measurement model, and is from the same state of calibration that was sampled to obtain the state when propagated through the motion model.

In particular, in one embodiment, the measurements of the sensor indicative of the angle of the steering wheel of the vehicle is included in the motion model and the measurement model, whereas the sensor indicative of the lateral acceleration and, additionally or alternatively the heading (yaw) rate, of the vehicle only affects the measurement model. In other words, a first sensor to measure an angle indicative of the steering angle of the steering wheel of the vehicle and a second sensor to measure a lateral acceleration and a heading rate. The motion model includes the state of calibration of the first sensor, but does not include the state of calibration of the second sensor. However, the measurement model includes both the state of calibration of the first sensor and the state of calibration of the second sensor.

In some embodiments, the updating the mean and the variance of the probabilistic distribution of the state of calibration of the first sensor is based on the function of weighted sampled states of calibration of the first sensor. Similarly, updating the mean and the variance of a probabilistic distribution of the state of calibration of the second sensor based on the function of a difference of weighted estimated states of calibration of the second sensor and the sensor measurement.

For example, the determining 720 of the probabilistic distribution of state of calibration and corresponding state of the vehicle can be done in several ways. For example, one embodiment determines the state of calibration by using a weighted average function to produce the state of calibration value as $$\hat{\mu}_k = \sum_{i=1}^{N} q_k^i \hat{\mu}_{k|k}^i$$

the variance of the probabilistic distribution of state of calibration as $$\sum_k \hat{} = \sum_{i=1}^{N} q_k^i \left( \frac{1}{v_{k|k} - n - 1} \Lambda_{k|k}^i + (\hat{\mu}_{k|k}^i - \hat{\mu}_k)(\hat{\mu}_{k|k}^i - \hat{\mu}_k)^T \right)$$

and similar for the state of the vehicle. That is the updating the mean and the variance of the probabilistic distribution of the state of calibration of the first sensor is based on the function of a difference of weighted sampled states of calibration of the first sensor and weighted estimated states of calibration of the first sensor. Similarly, the updating the mean and the variance of a probabilistic distribution of the state of calibration of the second sensor is based on the function of a difference of weighted estimated states of calibration of the second sensor and the sensor measurement. Another embodiment determines the said quantities as the state and parameters with highest probability.

Figure 7D:
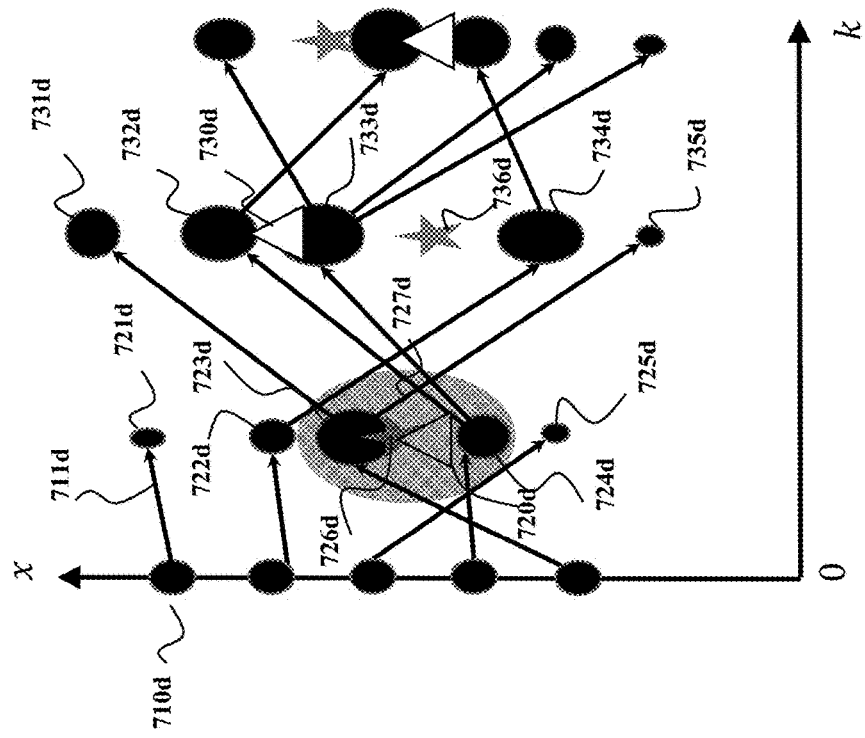
FIG. 7D is a simplified schematic of the result of three iterations of some steps of the method of FIG. 7A according to one embodiment.

FIG. 7D shows a simplified schematic of the result of three iterations of steps 700, 710, and 720 when five sampled state of calibration values are generated for each iteration. The initial state 710d is predicted forward in time 711d using the model of the motion and the inputs to the system and the five sampled state of calibration values, used to parameterize the dynamic model, to produce five next states 721d, 722d, 723d, 724d, and 725d. The probabilities are determined as a function of the measurement 726d and the estimates of the variance and the offset 727d of the measurement 726d, after updating the estimates of the variance and the offset. At each time step, i.e., at each iteration, an aggregate of the probabilities is used to produce an aggregated set of state of calibrations and corresponding state 720d.

FIG. 7E shows possible assigned probabilities of the five states at the first iteration in FIG. 7D. Those probabilities 721e, 722e, 723e, 724e, and 725e are reflected in selecting the sizes of the dots illustrating the states 721d, 722d, 723d, 724d, and 725d.

Referring back to FIG. 7D, the state 720d, together with the associated state of calibration are used as output 721 in FIG. 7A for control 740 of the vehicle. Referring back to FIG. 7C, if the threshold 714 is met, high-probability states and corresponding offset and variance terms are duplicated and become the initial states for the next iteration that again produces five sampled state of calibration values transitioning the state of the vehicle from the initial state 721d, 722d, 723d, and 724d to next states 731d, 732d, 733d, 734d, and 735d. The control input corresponding to the state 730d is selected according the probabilities of the sampled control inputs of this iteration. The states 732d, 733d, and 734d are the initial states for the next iteration in this particular example, but in general, all states could be expanded forward in time.

Figure 8:
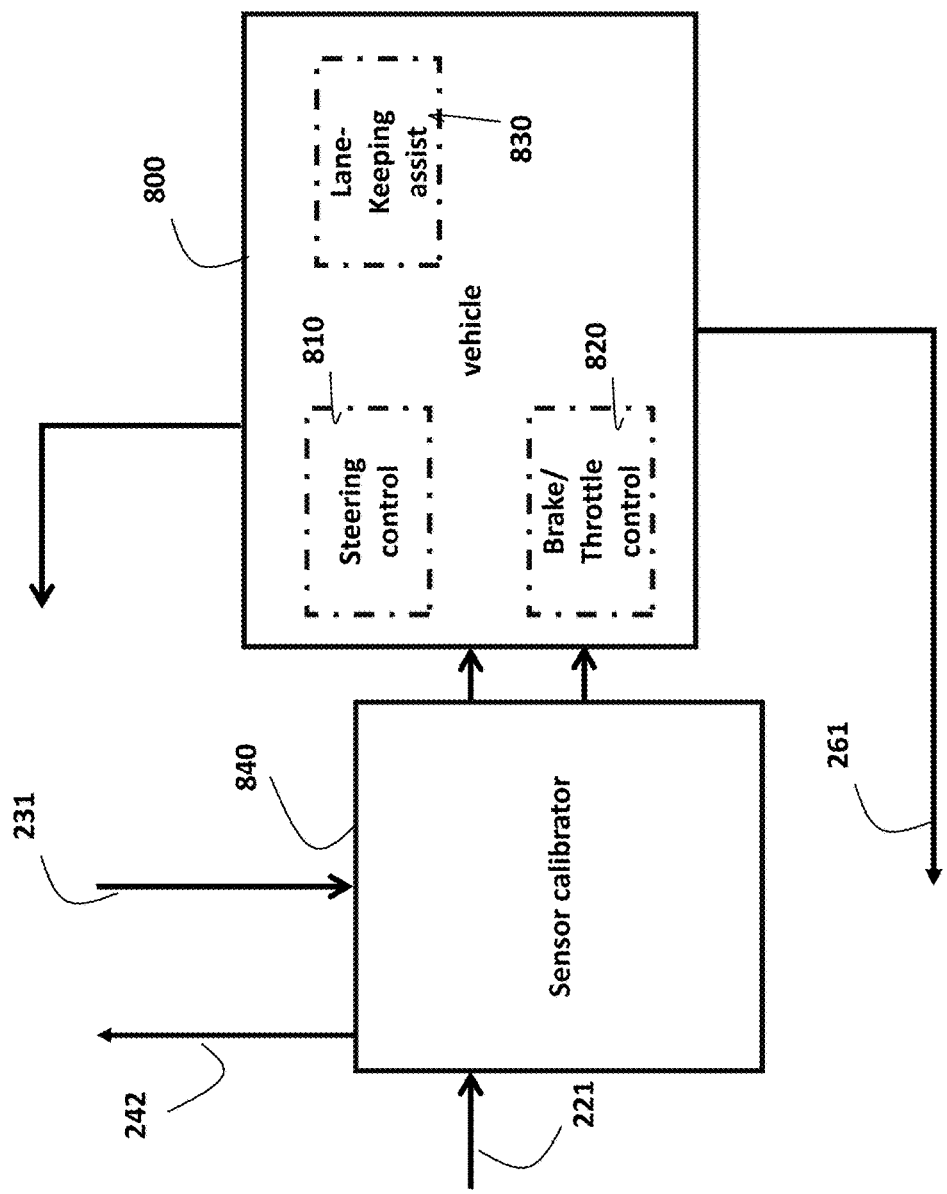
FIG. 8 is a schematic of interaction between the calibrator and vehicle controllers according to some embodiments.

FIG. 8 shows a schematic of interaction between the control system and the vehicle controllers according to some embodiments of the invention. For example, in some embodiments of the invention, the controllers of the vehicle 800 are steering 810 and brake/throttle controllers 820 that control rotation and acceleration of the vehicle 800. In such a case, the state-of-sensor estimator 840 outputs both state of calibration values related to both the sensors measuring longitudinal motion and sensors measuring lateral motion. However, in one embodiment a lane-keeping assist 830 is used, such that the estimation system outputs only lateral components. In both cases, a vehicle controller 800 maps the parameters to a vehicle model used by at least one controller of the vehicle controlling at least one actuator of the vehicle, such as the steering wheel and/or the brakes of the vehicle, and controls the motion of the vehicle using the control command to the actuator of the vehicle. In another embodiment, the state of calibration estimator outputs 242 indication of the tire pressure loss to a display visible to the driver.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a vehicle, comprising:
   at least one sensor to sense measurements indicative of a state of the vehicle;
   a memory to store a motion model of the vehicle, a measurement model of the vehicle, and a mean and a variance of a probabilistic distribution of a state of calibration of the sensor, wherein the motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor, and wherein the measurement model relates the measurements of the sensor to the state of the vehicle using the state of calibration of the sensor;
   a processor configured to
      sample a feasible space of the state of calibration of the sensor defined by the probabilistic distribution to produce a set of sampled states of calibration of the sensor;
      estimate, for each sampled state of calibration using the motion model, an estimation of the current state of the vehicle to produce a set of estimated states of the vehicle;
      estimate, for each estimated state of the vehicle, an estimated state of calibration of the sensor by inserting the measurements and the estimated state of the vehicle into the measurement model; and
      update the mean and the variance of the probabilistic distribution of the state of calibration of the sensor stored in the memory based on a function of the sampled states of calibration weighted with weights determined based on a difference between the sampled state of calibration and the corresponding estimated state of calibration; and
   a controller to control the vehicle using the measurements of the sensor adapted using the updated probabilistic distribution of the state of calibration of the sensor.

2. The system of claim 1, wherein the set of sampled states of calibration of the sensor represents the state of calibration of the sensor as a set of particles, each particle includes a mean and a variance of the state of calibration of the sensor defining the feasible space of the parameters of the state of calibration of the sensor, and wherein the processor
   updates iteratively, until a termination condition is met, the mean and the variance of at least one particle using a difference between the estimated state of calibration of the sensor estimated for the particle and the measured state of calibration of the sensor determined for the particle;
   updates the mean and the variance of the probabilistic distribution of the state of calibration of the sensor as a function of the updated mean and the updated variance of the particle.

3. The system of claim 2, wherein, for the iteration updating the particle, the processor is configured to
   determine the mean of the estimated state of calibration of the sensor that results in the state of the vehicle estimated for the particle according to the measurement model;
   determine the variance of the estimated state of calibration of the sensor as a combination of an uncertainty of the measurements and the variance of the particle;
   update the mean of the sampled state of calibration of the sensor of the particle using the mean of the estimated state of calibration of the sensor; and
   update the variance of the sampled state of calibration of the sensor of the particle using the variance of the estimated state of calibration of the sensor.

4. The system of claim 3, wherein the processor determines the variance of the estimated state of calibration of the sensor as the combination of the uncertainty of the measurements and a set of variances of the set of particles.

5. The system of claim 4, wherein the number of particles in the set of particle are varying over time.

6. The system of claim 1, wherein the function uses a weighted combination of the sampled states of calibration of the sensor.

7. The system of claim 1, wherein the sensor is calibrated using the updated probabilistic distribution of the state of calibration of the sensor.

8. The system of claim 1, wherein the at least one sensor includes a first sensor to measure an angle indicative of the steering angle of the steering wheel of the vehicle and a second sensor to measure at least one of a lateral acceleration and a heading rate, wherein the motion model includes the state of calibration of the first sensor, but does not include the state of calibration of the second sensor, and wherein the measurement model includes both the state of calibration of the first sensor and the state of calibration of the second sensor.

9. The system of claim 8,
   wherein the processor updates the mean and the variance of the probabilistic distribution of the state of calibration of the first sensor based on the function of a difference of weighted sampled states of calibration of the first sensor and weighted estimated states of calibration of the first sensor, and
   wherein the processor updates the mean and the variance of a probabilistic distribution of the state of calibration of the second sensor based on the function of a difference of weighted estimated states of calibration of the second sensor and the sensor measurement.

10. The system of claim 1, wherein the state of the vehicle includes a velocity and a heading rate of the vehicle,
    wherein the motion model of the vehicle includes a combination of a deterministic component of the motion and a probabilistic component of the motion, wherein the deterministic component of the motion is independent from the state of calibration of the sensor and defines the motion of the vehicle as a function of time, wherein the probabilistic component of the motion includes the state of calibration of the sensor having an uncertainty and defines disturbance on the motion of the vehicle,
    wherein the measurement model of the vehicle includes a combination of a deterministic component of the measurement model independent from the state of calibration of the sensor and a probabilistic component of the measurement model that includes the state of calibration of the sensor.

11. A method for controlling a vehicle, wherein the method uses a processor coupled with stored instructions implementing the method, wherein the instructions, when executed by the processor carry out at least some steps of the method, comprising:
    sensing, using at least one sensor, measurements indicative of a state of the vehicle;
    retrieving, from a memory operatively connected to the processor, a motion model of the vehicle, a measurement model of the vehicle, and a mean and a variance of a probabilistic distribution of a state of calibration of the sensor, wherein the motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor, and wherein the measurement model relates the measurements of the sensor to the state of the vehicle using the state of calibration of the sensor;

sampling a feasible space of the state of calibration of the sensor defined by the probabilistic distribution to produce a set of sampled states of calibration of the sensor;

estimating, for each sampled state of calibration using the motion model, an estimation of the current state of the vehicle to produce a set of estimated states of the vehicle;

estimating, for each estimated state of the vehicle, an estimated state of calibration of the sensor by inserting the measurements and the estimated state of the vehicle into the measurement model; and updating the mean and the variance of the probabilistic distribution of the state of calibration of the sensor stored in the memory based on a function of the sampled states of calibration weighted with weights determined based on a difference between the sampled state of calibration and the corresponding estimated state of calibration; and controlling the vehicle using the measurements of the sensor adapted using the updated probabilistic distribution of the state of calibration of the sensor.

12. The method of claim 11, wherein the set of sampled states of calibration of the sensor represents the state of calibration of the sensor as a set of particles, each particle includes a mean and a variance of the state of calibration of the sensor defining the feasible space of the parameters of the state of calibration of the sensor, comprising:

updating iteratively, until a termination condition is met, the mean and the variance of at least one particle using a difference between the estimated state of calibration of the sensor estimated for the particle and the measured state of calibration of the sensor determined for the particle;

updating the mean and the variance of the probabilistic distribution of the state of calibration of the sensor as a function of the updated mean and the updated variance of the particle.

13. The method of claim 12, further comprising, for the iteration updating the particle, determining the mean of the estimated state of calibration of the sensor that results in the state of the vehicle estimated for the particle according to the measurement model;

determining the variance of the estimated state of calibration of the sensor as a combination of an uncertainty of the measurements and the variance of the particle;

updating the mean of the sampled state of calibration of the sensor of the particle using the mean of the estimated state of calibration of the sensor; and updating the variance of the sampled state of calibration of the sensor of the particle using the variance of the estimated state of calibration of the sensor.

14. The method of claim 13, wherein the variance of the estimated state of calibration of the sensor is determined as the combination of the uncertainty of the measurements and a set of variances of the set of particles.

15. The method of claim 14, wherein the number of particles are varying over time.

16. The method of claim 11, wherein the function uses a weighted combination of the sampled states of calibration of the sensor.

17. The method of claim 11, further comprising:
calibrating the sensor using the updated probabilistic distribution of the state of calibration of the sensor.

18. The method of claim 11, wherein the at least one sensor includes a first sensor to measure an angle indicative of the steering angle of the steering wheel of the vehicle and a second sensor to measure at least one of a lateral acceleration and a heading rate, wherein the motion model includes the state of calibration of the first sensor, but does not include the state of calibration of the second sensor, and wherein the measurement model includes both the state of calibration of the first sensor and the state of calibration of the second sensor, comprising:

updating the mean and the variance of the probabilistic distribution of the state of calibration of the first sensor based on the function of a difference of weighted sampled states of calibration of the first sensor and weighted estimated states of calibration of the first sensor, and updating the mean and the variance of a probabilistic distribution of the state of calibration of the second sensor based on the function of a difference of weighted estimated states of calibration of the second sensor and the sensor measurement.

19. The method of claim 11, wherein the state of the vehicle includes a velocity and a heading rate of the vehicle, wherein the motion model of the vehicle includes a combination of a deterministic component of the motion and a probabilistic component of the motion, wherein the deterministic component of the motion is independent from the state of calibration of the sensor and defines the motion of the vehicle as a function of time, wherein the probabilistic component of the motion includes the state of calibration of the sensor having an uncertainty and defines disturbance on the motion of the vehicle, wherein the measurement model of the vehicle includes a combination of a deterministic component of the measurement model independent from the state of calibration of the sensor and a probabilistic component of the measurement model that includes the state of calibration of the sensor.

20. A non-transitory computer readable memory embodied thereon a program executable by a processor for performing a method for controlling a vehicle, the method comprising:

receiving, from at least one sensor, measurements indicative of a state of the vehicle;

retrieving, from a memory operatively connected to the processor, a motion model of the vehicle, a measurement model of the vehicle, and a mean and a variance of a probabilistic distribution of a state of calibration of the sensor, wherein the motion model of the vehicle defines the motion of the vehicle from a previous state of the vehicle to a current state of the vehicle subject to disturbance caused by an uncertainty of the state of calibration of the sensor in the motion of the vehicle, such that the motion model includes a state of calibration sampled on the probabilistic distribution of the state of calibration of the sensor, and wherein the measurement model relates the measurements of the sensor to the state of the vehicle using the state of calibration of the sensor;

sampling a feasible space of the state of calibration of the sensor defined by the probabilistic distribution to produce a set of sampled states of calibration of the sensor;

estimating, for each sampled state of calibration using the motion model, an estimation of the current state of the vehicle to produce a set of estimated states of the vehicle;

estimating, for each estimated state of the vehicle, an estimated state of calibration of the sensor by inserting the measurements and the estimated state of the vehicle into the measurement model; and updating the mean and the variance of the probabilistic distribution of the state of calibration of the sensor stored in the memory based on a function of the sampled states of calibration weighted with weights determined based on a difference between the sampled state of calibration and the corresponding estimated state of calibration; and controlling the vehicle using the measurements of the sensor adapted using the updated probabilistic distribution of the state of calibration of the sensor.

* * * * *